(12) United States Patent
Iida et al.

(10) Patent No.: US 10,836,025 B2
(45) Date of Patent: Nov. 17, 2020

(54) POWER TOOL

(71) Applicant: MAKITA CORPORATION, Anjo (JP)

(72) Inventors: Hitoshi Iida, Anjo (JP); Masanori Furusawa, Anjo (JP)

(73) Assignee: MAKITA CORPORATION, Anjo (JP)

( * ) Notice: Subject to any disclaimer, the term of this patent is extended or adjusted under 35 U.S.C. 154(b) by 189 days.

(21) Appl. No.: 15/724,598

(22) Filed: Oct. 4, 2017

(65) Prior Publication Data

US 2018/0099393 A1 Apr. 12, 2018

(30) Foreign Application Priority Data

Oct. 7, 2016 (JP) ................................. 2016-198986
Apr. 12, 2017 (JP) ................................. 2017-079290

(51) Int. Cl.
*B25D 16/00* (2006.01)
*B25D 17/04* (2006.01)
(Continued)

(52) U.S. Cl.
CPC ............ *B25D 16/006* (2013.01); *B25D 11/00* (2013.01); *B25D 17/043* (2013.01); *B25D 17/20* (2013.01);
(Continued)

(58) Field of Classification Search
CPC .......... B25D 11/00–125; B25D 16/006; B25D 17/043; B25D 17/20; B25D 17/24;
(Continued)

(56) References Cited

U.S. PATENT DOCUMENTS 3,114,421 A 12/1963 McCloud
3,144,571 A 8/1964 Kukulski
(Continued)

FOREIGN PATENT DOCUMENTS

DE 102006044433 A1 4/2008
EP 1477282 A1 11/2004
(Continued)

OTHER PUBLICATIONS

Google Patent (English Translation) of Ito (WO 2014119135 A1) (Year: 2014).*
(Continued)

*Primary Examiner* — Chelsea E Stinson
*Assistant Examiner* — Himchan Song
(74) *Attorney, Agent, or Firm* — J-Tek Law PLLC; Jeffrey D. Tekanic; Scott T. Wakeman

(57) ABSTRACT

A power tool contains a brushless motor that includes a stator having a stack thickness and an outer diameter, a rotor having a diameter, and a motor shaft extending from the rotor and having a rotational axis. A drive mechanism is operably coupled to the motor shaft and is configured to drive a tool accessory in relation to a drive axis. A first housing houses the motor and the drive mechanism. The drive axis does not intersect the brushless motor, but the rotational axis of the motor shaft intersects the drive axis. The outer diameter of the stator is at least five times greater than the stack thickness. Furthermore, the diameter of the rotor is greater than the stack thickness.

21 Claims, 8 Drawing Sheets

(51) Int. Cl.
*B25D 11/00* (2006.01)
*B25D 17/20* (2006.01)
*B25D 17/24* (2006.01)
*F21V 33/00* (2006.01)

(52) U.S. Cl.
CPC .............. *B25D 17/24* (2013.01); *F21V 33/00* (2013.01); *B25D 2211/003* (2013.01); *B25D 2211/068* (2013.01); *B25D 2216/0015* (2013.01); *B25D 2216/0023* (2013.01); *B25D 2216/0038* (2013.01); *B25D 2216/0084* (2013.01); *B25D 2222/72* (2013.01); *B25D 2250/095* (2013.01); *B25D 2250/121* (2013.01); *B25D 2250/265* (2013.01)

(58) Field of Classification Search
CPC ........ B25D 2211/003; B25D 2211/068; B25D 2216/0015; B25D 2216/0023; B25D 2216/0038; B25D 2216/0084; B25D 2250/095; B25D 2250/121; B25D 2250/265; F21V 33/00
USPC ....................................... 173/90; 310/47, 50
See application file for complete search history.

(56) References Cited

U.S. PATENT DOCUMENTS

| | | |
|---|---|---|
| 4,202,096 A | 5/1980 | Nagashima |
| 4,450,919 A | 5/1984 | Cousineau |
| 4,638,562 A | 1/1987 | Drake |
| 4,664,394 A | 5/1987 | Theissig et al. |
| 4,667,749 A | 5/1987 | Keller |
| 4,670,985 A | 6/1987 | Biersteker |
| 5,692,574 A | 12/1997 | Terada |
| 5,697,456 A | 12/1997 | Radle et al. |
| 7,051,820 B2 | 5/2006 | Stirm |
| 7,143,842 B2 | 12/2006 | Ikuta |
| 8,966,773 B2 | 3/2015 | Gregorich |
| 2001/0037889 A1 | 11/2001 | Kristen et al. |
| 2002/0125023 A1 | 9/2002 | Hanke et al. |
| 2003/0121679 A1 | 7/2003 | Taga |
| 2004/0194987 A1 | 10/2004 | Hanke et al. |
| 2004/0211576 A1 | 10/2004 | Milbourne et al. |
| 2005/0157489 A1 | 7/2005 | Oomori et al. |
| 2005/0257945 A1 | 11/2005 | Justis et al. |
| 2005/0269117 A1 | 12/2005 | Sato et al. |
| 2006/0231277 A1 | 10/2006 | Puzio et al. |
| 2007/0044984 A1 | 3/2007 | Fischer et al. |
| 2007/0144310 A1 | 6/2007 | Pozgay et al. |
| 2007/0159812 A1 | 7/2007 | Oomori et al. |
| 2007/0209814 A1 | 9/2007 | Furusawa et al. |
| 2007/0261871 A1 | 11/2007 | Ohlendort |
| 2007/0295522 A1 | 12/2007 | Bohne et al. |
| 2009/0049651 A1 | 2/2009 | Roberts et al. |
| 2009/0223691 A1 | 9/2009 | Ikuta et al. |
| 2009/0236110 A1 | 9/2009 | Iwakami et al. |
| 2009/0266571 A1 | 10/2009 | Baumann et al. |
| 2009/0314507 A1 | 12/2009 | Iwakami |
| 2009/0321101 A1 | 12/2009 | Furusawa et al. |
| 2010/0000748 A1 | 1/2010 | Machida et al. |
| 2010/0038105 A1 | 2/2010 | Kikuchi et al. |
| 2010/0051304 A1 | 3/2010 | Aoki |
| 2010/0095533 A1 | 4/2010 | Takahashi et al. |
| 2011/0011608 A1 | 1/2011 | Saur |
| 2011/0083868 A1 | 4/2011 | Nishikimi et al. |
| 2011/0088922 A1* | 4/2011 | Hirayama ................. B25F 5/02 173/90 |
| 2011/0100665 A1 | 5/2011 | Nakashima |
| 2011/0114347 A1 | 5/2011 | Kasuya et al. |
| 2011/0127055 A1* | 6/2011 | Braun ................. B25D 11/005 173/117 |
| 2011/0147031 A1 | 6/2011 | Matthias et al. |
| 2011/0168422 A1 | 7/2011 | Fujiwara et al. |
| 2011/0199756 A1 | 8/2011 | Oomori et al. |
| 2011/0203826 A1 | 8/2011 | Hosokawa et al. |
| 2011/0290517 A1 | 12/2011 | Takeuchi et al. |
| 2011/0297407 A1 | 12/2011 | Sakai |
| 2011/0303726 A1 | 12/2011 | Blessing et al. |
| 2011/0303733 A1 | 12/2011 | Fielitz et al. |
| 2011/0308828 A1 | 12/2011 | Shinma et al. |
| 2012/0031638 A1 | 2/2012 | Kamegai et al. |
| 2012/0033405 A1 | 2/2012 | Oomori et al. |
| 2012/0067605 A1 | 3/2012 | Furusawa et al. |
| 2012/0097410 A1 | 4/2012 | Honsa |
| 2012/0160533 A1 | 6/2012 | Kamegai |
| 2012/0165152 A1* | 6/2012 | Tokunaga ................. B25B 21/00 475/159 |
| 2012/0255753 A1 | 10/2012 | Kuhnle et al. |
| 2012/0279740 A1* | 11/2012 | Furusawa .............. B25D 17/24 173/79 |
| 2012/0315103 A1 | 12/2012 | Aoki |
| 2012/0318551 A1 | 12/2012 | Kuhnle et al. |
| 2013/0000936 A1* | 1/2013 | Onoda ................... B25D 16/00 173/117 |
| 2013/0043052 A1 | 2/2013 | Harcar et al. |
| 2013/0099722 A1 | 4/2013 | Umemura et al. |
| 2013/0153253 A1 | 6/2013 | Ludy et al. |
| 2013/0168121 A1 | 7/2013 | Ullrich et al. |
| 2013/0199810 A1 | 8/2013 | Wyler |
| 2014/0145524 A1* | 5/2014 | Tanimoto ............ B25B 23/1475 310/50 |
| 2014/0174777 A1 | 6/2014 | Kakiuchi et al. |
| 2015/0041170 A1* | 2/2015 | Yoshikane ........... B25D 11/062 173/104 |
| 2015/0174753 A1* | 6/2015 | Kamiya .................. B25F 5/026 173/170 |
| 2015/0280517 A1* | 10/2015 | Ekstrom ................. H01H 21/12 173/170 |
| 2015/0372633 A1* | 12/2015 | Machida .............. B25D 16/006 318/14 |
| 2016/0001433 A1 | 1/2016 | Furusawa et al. |
| 2016/0136801 A1 | 5/2016 | Furusawa et al. |
| 2016/0151905 A1 | 6/2016 | Tada et al. |
| 2017/0106517 A1 | 4/2017 | Machida |
| 2017/0106518 A1* | 4/2017 | Takeuchi ............. B25D 17/043 |
| 2017/0194846 A1* | 7/2017 | Tanimoto ............... B25D 16/00 |
| 2017/0312902 A1* | 11/2017 | Noguchi ................... B25F 5/02 |
| 2018/0099396 A1 | 4/2018 | Iida et al. |
| 2019/0006909 A1* | 1/2019 | Nagahama ............. H02K 11/21 |

FOREIGN PATENT DOCUMENTS

| | | | |
|---|---|---|---|
| EP | 2468455 A1 | 6/2012 | |
| FR | 2488179 A1 | 2/1982 | |
| GB | 2154497 A | 9/1985 | |
| JP | S55151482 U | 10/1980 | |
| JP | S5976218 A | 5/1984 | |
| JP | S6181888 U | 5/1986 | |
| JP | 2005219195 A | 8/2005 | |
| JP | 2007196337 A | 8/2007 | |
| JP | 2010144921 A | 7/2010 | |
| JP | 2014024126 A | 2/2014 | |
| JP | 2014124697 A | 7/2014 | |
| JP | 2014124698 A | 7/2014 | |
| JP | 2014133284 A | 7/2014 | |
| JP | 2016022567 A | 2/2016 | |
| WO | 2008034668 A1 | 3/2008 | |
| WO | WO-2014119135 A1 * | 8/2014 | ................ B25F 5/02 |
| WO | WO-2015145583 A1 * | 10/2015 | ........... B25D 17/043 |
| WO | 2015145583 A1 | 12/2015 | |
| WO | 2015190355 A1 | 12/2015 | |

OTHER PUBLICATIONS

Extended European Search Report from the European Patent Office dated Mar. 13, 2018 in related EP application 17194957.1, including European Search Opinion, European Search Report, and examined claims.

* cited by examiner

FIG. 3

POWER TOOL

CROSS-REFERENCE TO RELATED APPLICATIONS

The present application claims priority to Japanese patent application serial number 2016-198986 filed on Oct. 7, 2016 and to Japanese patent application serial number 2017-079290 filed on Apr. 12, 2017, the contents of both of which are incorporated fully herein by reference.

TECHNICAL FIELD

The present invention generally relates to a portable electrically-driven processing machine, such as, e.g., a power tool that is configured to perform work by driving a tool accessory in relation to a prescribed drive axis.

BACKGROUND ART

Some portable (cordless) power tools drive a tool accessory using a rechargeable-type battery (battery pack or battery cartridge) as its motive-power source (power supply). One example of such a power tool is configured to linearly drive (reciprocally drive) a tool accessory in an impact-axis direction using a motor as the drive source. For example, Japanese Laid-open Patent Publication 2016-22567 discloses: a hammer drill comprising a brushless motor that uses a battery as the power supply; a hammer drill comprising an alternating-current commutator motor; and the like.

SUMMARY

In the above-mentioned known hammer drill, the motor is disposed inside a housing such that the output shaft of the motor extends in a direction (an up-down direction) that intersects an impact axis of the tool accessory. In a hammer drill having such a motor arrangement, the region in which the motor is disposed is comparatively large (relatively long) in the up-down direction of the power tool (i.e. perpendicular to the impact axis). Consequently, design options for arranging other structural elements within the housing tend to be limited.

It is therefore an object of the present teachings to disclose techniques for rationalizing the structure of an electrically-driven-type processing machine, such as e.g., a power tool configured to perform work by driving a tool accessory in relation to a prescribed drive axis, in order to make the region in which the motor is disposed more compact.

For example, the present teachings preferably may be applied to a power tool configured to perform work by driving a tool accessory in relation to a prescribed drive axis. In one aspect of the present teachings, such a power tool may comprise a motor, a drive mechanism, and a housing.

The motor comprises a motor-main-body part and a motor shaft. The motor-main-body part comprises a stator and a rotor. The motor shaft extends from the rotor. The drive mechanism is preferably configured to drive, and/or includes components capable of driving, the tool accessory by using the motive power of the motor. The housing houses the motor and the drive mechanism. In addition, with regard to location of the motor, the motor-main-body part is spaced apart from the drive axis, and the rotational axis of the motor shaft is disposed such that it extends in a direction that intersects the drive axis. Furthermore, the motor is preferably configured as a brushless motor in which the ratio of the stack thickness of the stator to the diameter of the stator is set to $\frac{1}{5}$ or less (i.e. the diameter of the stator is five times or greater than the stack thickness of the stator), and the diameter of the rotor is preferably greater than the stack thickness.

Brushless motors, in which the ratio of the stack thickness of the stator to the diameter of the stator is set to $\frac{1}{5}$ or less and the diameter of the rotor is set greater than the stack thickness, are also known as flat motors, flat brushless motors, pancake brushless motors, etc. That is, the size (length) of the stator in the extension direction of the rotational axis of the motor shaft is relatively small (short) compared to the (larger) size (width) of the stator in the diameter direction. By using such a brushless motor according to this aspect of the present teachings, the region of the power tool, in which the motor is disposed, can be reduced (made shorter) in the extension direction of the rotational axis and, in turn, the power tool can be made more compact. Alternatively, it also becomes possible to dispose other structural elements in the volume around the flat brushless motor without increasing the overall size (length) of the power tool in the extension direction of the rotational axis.

As used herein, the term "power tool" is intended to encompass electrically-driven tools, e.g., used in construction or DIY projects, in which the tool accessory is driven in relation to the prescribed drive axis. For example, the power tool may be configured to: (i) linearly drive (reciprocally drive) the tool accessory in the prescribed drive-axis direction (i.e. hammering only), (ii) rotationally drive (rotate) the tool accessory around the prescribed drive axis (i.e. rotation only), or (iii) simultaneously rotate the tool accessory while linearly reciprocating (striking) it (i.e. hammering with rotation).

In one embodiment of the present teachings, the power tool may be a rotary hammer or hammer drill configured to linearly drive (strike or hammer) the tool accessory in the drive-axis direction. The drive mechanism may optionally comprise: a hammer element configured to linearly drive the tool accessory in the drive-axis direction by striking the tool accessory; and a motion-converting mechanism configured to convert rotary motion of the motor into linear motion and transmit such linear motion (striking motion) to the hammer element. Optionally, the motion-converting mechanism may be configured as a crank mechanism. A drive mechanism in which a crank mechanism is used as the motion-converting mechanism tends to be large compared with a drive mechanism in which an oscillating device is used. However, according to such an embodiment of the present teachings, even if a crank mechanism is used, it is still possible to prevent an increase in the overall size of the power tool configured to perform a hammering operation because the motor is configured as a brushless motor, in which the stack thickness of the stator is $\frac{1}{5}^{th}$ or less of (20% or less than) the diameter of the stator, and the diameter of the rotor is larger than the stack thickness.

According to another aspect of the present teachings, the power tool may be configured such that one of a plurality of operation modes is selectable in accordance with an external operation (e.g., manual manipulation (e.g., rotation or pivoting) of a dial or knob) and is configured to operate in accordance with the selected operation mode. According to the present aspect, a user can use the power tool by selecting an operation mode in accordance with the desired processing work to be performed. It is noted that if the power tool is configured as a striking or hammering tool (e.g., a rotary hammer or a hammer drill), then a hammer mode ("hammering only"), in which only the operation (the so-called hammering operation) that linearly drives the tool accessory in the drive-axis direction is performed, and a drill mode, in which at least an operation (a so-called drill operation) that rotationally drives the tool accessory around the drive axis is performed, can be given as typical examples of the plurality of operation modes. The term "drill mode" as used herein is intended to encompass (include) one, two or all of: the operation mode, in which only the drill operation is performed ("rotation only"); the operation mode, in which the drill operation and the hammering operation are performed ("hammering with rotation"); and another operation mode, in which, in addition to the drill operation, an operation other than the hammering operation is performed.

According to another aspect of the present teachings, the power tool may further comprise: a fan that is rotated by the motor; and a controller configured to control the operation of the power tool. The fan may be configured to generate a cooling draft that flows in via one or more vents formed in the housing, passes around (across) the periphery of the controller, and then passes around (across) the periphery of the motor. According to the present aspect, the controller and motor, which require cooling, can be efficiently cooled by virtue of the fan generating the flow of cooling draft.

According to another aspect of the present teachings, the controller may be configured as a control apparatus of the brushless motor. The control apparatus of the brushless motor generally comprises a control circuit (e.g., a microprocessor and memory), an inverter circuit, and the like, which can generate relatively large amounts of heat during operation. Therefore the requirement for cooling is high in such a power tool. According to the present aspect, the control apparatus of the brushless motor can be effectively cooled due to the arrangement of the fan, vents, motor, controller etc. within the housing as discussed above.

According to another aspect of the present teachings, the power tool may further comprise: a grasp part (handle) configured to be grasped (held) by a user to control the operation of the power tool during processing work. The housing may comprise a first housing part that houses the motor and the drive mechanism. Furthermore, the grasp part is coupled to, and is capable of relative movement relative to, the first housing part via at least one elastic element. According to the present aspect, it is possible to reduce the transmission of vibration from the first housing part, in which the motor and the drive mechanism that constitute the vibration sources are housed, to the grasp part (handle), which is held by the user.

According to another aspect of the present teachings, the housing may comprise a second housing part that is coupled to, and is capable of relative movement relative to, the first housing part via the at least one elastic element. The second housing part may include the grasp part (handle). According to the present aspect, a so-called vibration-isolating housing, which comprises the first housing part elastically coupled to the second housing part, is formed and enables the grasp part (handle) to be arranged in a rational manner.

According to another aspect of the present teachings, the power tool may further comprise: a (the) controller configured to control the operation of the power tool. Furthermore, the second housing part may comprise a battery-mounting part that houses the controller and is configured such that a battery can be mounted thereon and dismounted (removed) therefrom. According to the present aspect, because it is possible to reduce the transmission of vibration from the first housing part, in which the motor and the drive mechanism that constitute the vibration sources are housed, to the second housing part, in which the controller is housed, the controller can be better protected (isolated) from vibration. In addition, by providing the battery-mounting part on the second housing part, chattering (contact bounce) caused by the terminals (contacts) of the battery bouncing against (separating from) the contact terminals of the battery-mounting part during operation can be prevented and/or wiring between the battery-mounting part and the controller can be simplified.

According to another aspect of the present teachings, the power tool further comprises: an illumination apparatus (light) provided on the second housing part and configured to radiate (shine) light toward the location at which work is performed by the tool accessory; and a manipulation member (e.g., a trigger) configured to be capable of an external operation (depressing, squeezing, etc.) by a user in order to energize and drive the motor. Furthermore, the illumination apparatus may be configured to turn ON, linked to the external operation of the manipulation member, prior to the motor being energized and driven. According to this aspect, by providing the illumination apparatus on the second housing part, which is coupled to the first housing part via the elastic element(s), it is possible to better protect (isolate) the illumination apparatus from vibration. In addition, because the light turns ON, linked to the operation of the manipulation member, before the energization and drive of the motor is started, the user can turn the illumination apparatus ON merely by manipulating a single manipulation member and, furthermore, the location at which work is performed by the tool accessory can be easily confirmed prior to the start of the actual work as well.

According to another aspect of the present teachings, a plurality of the battery-mounting parts may be provided on the second housing part.

Other objects, features, embodiments, functions, and effects of the present teachings will be readily apparent to persons of ordinary skill in the art upon reading the following detailed description of preferred embodiments of the present teachings, the claims, and the attached drawings.

BRIEF DESCRIPTION OF THE DRAWINGS

FIG. 3 is an enlarged view of a motor-housing part, and the peripheral portion thereof, shown in FIG. 2.

DETAILED DESCRIPTION OF EMBODIMENTS

Figure 1:
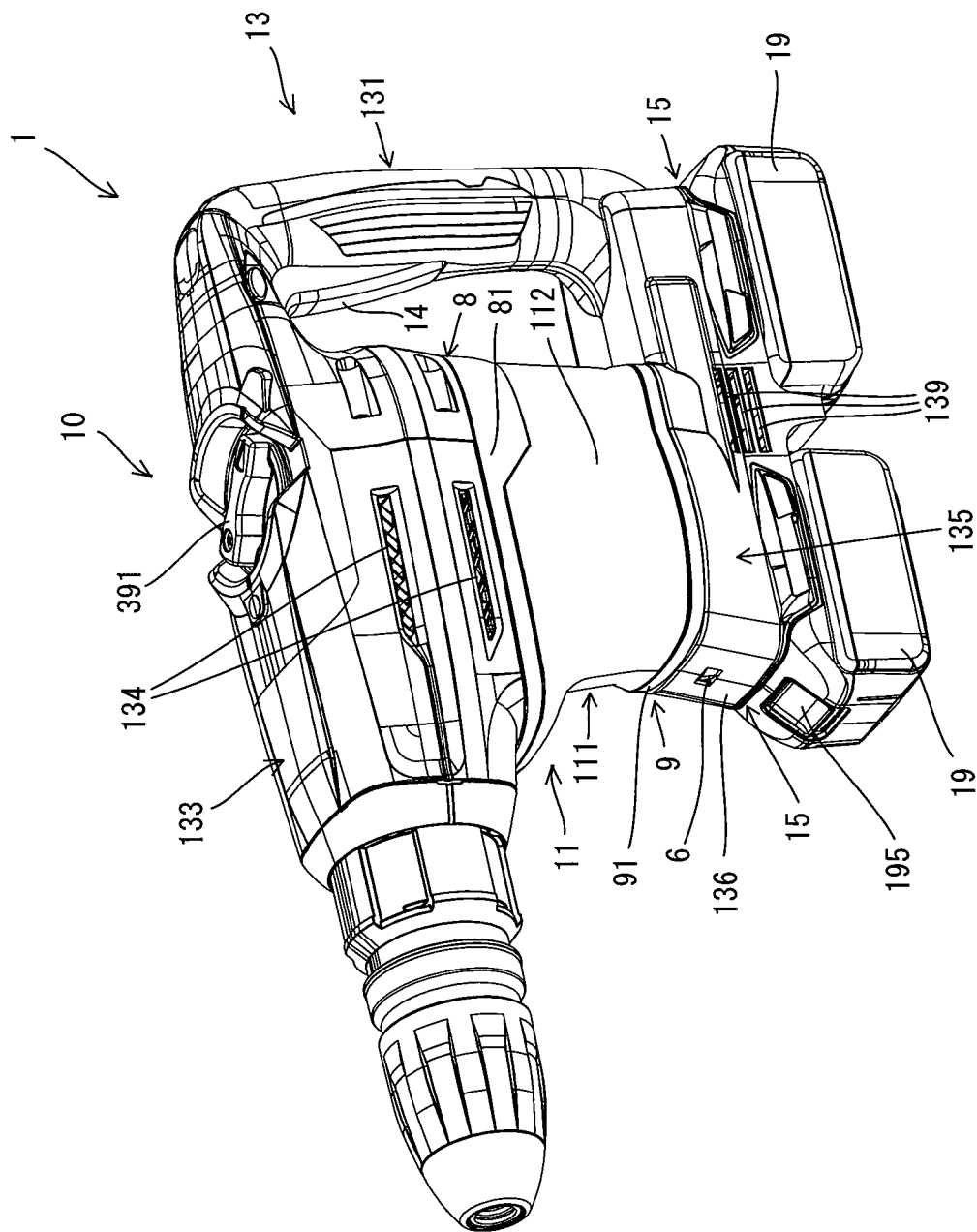
FIG. 1 is an oblique view that shows the external appearance of a hammer drill according to a first embodiment of the present teachings.

Embodiments of the present teachings are explained below, with reference to the drawings. It is noted that the embodiments below illustrate by example electrically-driven hammer drills 1, 101, which serve as representative, non-limiting examples of power tools (electrically-driven processing machines) according to the present teachings.

First Embodiment

The hammer drill 1 according to a first embodiment is explained below, with reference to FIG. 1 to FIG. 7. The hammer drill 1 of the present embodiment is configured to perform both an operation (a hammering operation) in which a tool accessory 18, which is mounted on (in) a tool holder 34, is linearly driven (reciprocally driven) along a prescribed impact axis A1 as well as an operation (a drill operation) in which the tool accessory 18 is rotationally driven around the impact axis A1.

First, a schematic configuration of the hammer drill 1 will be explained, with reference to FIGS. 1 and 2. The contour (outer periphery) of the hammer drill 1 is formed principally by a housing 10. The housing 10 of the present embodiment is configured as a so-called vibration-isolating housing and comprises a first housing part 11 and a second housing part 13, which is elastically coupled to, and is capable of moving (e.g., sliding in an oscillating manner) relative to, the first housing part 11.

Figure 2:
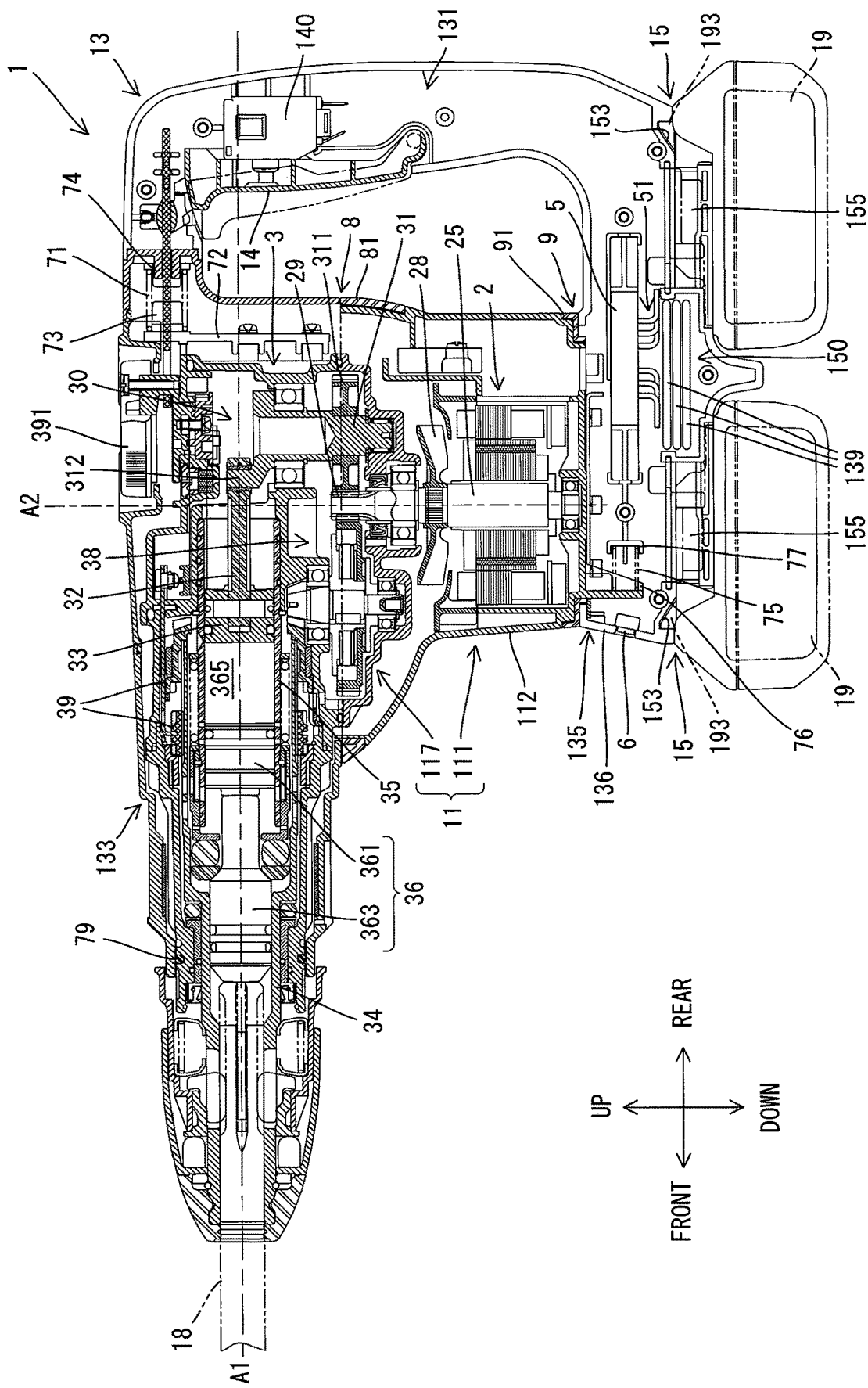
FIG. 2 is a longitudinal cross-sectional view of the hammer drill in an initial state.

As shown in FIG. 2, the first housing part 11 comprises: a motor-housing part 111 that houses a motor 2; and a drive-mechanism housing part 117 that houses a drive mechanism 3, which is configured to drive the tool accessory 18 by using the motive power of the motor 2. The first housing part 11 is formed in substantially an L shape as a whole. The drive-mechanism housing part 117 has (is formed into) an elongate shape extending in the impact axis A1 direction. The tool holder 34, which is configured such that the tool accessory 18 can be mounted thereon (therein) and dismounted (removed) therefrom, is provided at one longitudinal (axial) end of the drive-mechanism housing part 117 in the impact axis A1 direction. At the other longitudinal (axial) end of the drive-mechanism housing part 117 in the impact axis A1 direction, the motor-housing part 111 is coupled and fixed to, and is incapable of relative movement with respect to, the drive-mechanism housing part 117 and is disposed such that it intersects the impact axis A1 and projects in a direction leading away from the impact axis A1. Inside the motor-housing part 111, the motor 2 is disposed such that a rotational axis A2 of a motor shaft 25 extends in a direction orthogonal to the impact axis A1.

It is noted that, for the sake of convenience in the explanation below, (i) the impact axis A1 direction of the hammer drill 1 is defined as the front-rear direction of the hammer drill 1, (ii) the side on which the tool holder 34 is provided is defined as the "front side" (also called the "tip area side") of the hammer drill 1, and (iii) the opposite side thereof is defined as the "rear side" of the hammer drill 1. In addition, (i) the direction in which the rotational axis A2 of the motor shaft 25 extends is defined as the up-down direction of the hammer drill 1, (ii) the direction in which the motor-housing part 111 protrudes from the drive-mechanism housing part 117 is defined as the downward direction and (iii) the opposite direction thereof is defined as the upward direction.

Referring again to FIG. 1, the second housing part 13 comprises a grasp part (handle) 131, an upper-side (first) portion 133, and a lower-side (second) portion 135. The second housing part 13 has (is formed in) substantially a U shape as a whole. The grasp part 131 is configured to be graspable (held) by a user and is a portion that is disposed extending in (extends parallel to) the rotational axis A2 direction (i.e., the up-down direction) of the motor shaft 25.

More specifically, the grasp part 131 is spaced apart rearward from the first housing part 11 and extends in the up-down direction. The upper-side portion 133 is connected to an upper-end part of the grasp part 131. In the present embodiment, the upper-side portion 133 extends frontward from the upper-end part of the grasp part 131 and is configured to cover most of the drive-mechanism housing part 117 of the first housing part 11. The lower-side portion 135 is connected to a lower-end part of the grasp part 131. In the present embodiment, the lower-side portion 135 extends frontward from the lower-end part of the grasp part 131 and is disposed on a lower side of the motor-housing part 111.

According to the above-described configuration, in the hammer drill 1 as shown in FIG. 1, the motor-housing part 111 of the first housing part 11 and the second housing part 13 are exposed externally and together form the outer surface of the hammer drill 1. The motor-housing part 111 of the first housing part 11 is sandwiched from above and below by the upper-side portion 133 and the lower-side portion 135, respectively, of the second housing part 13. In addition, the second housing part 13 is coupled to the first housing part 11 via elastic elements, as will be discussed below. Furthermore, the upper-side portion 133 and the lower-side portion 135 are configured to be slidable relative to (in sliding contact with) the upper-end part and the lower-end part, respectively, of the motor-housing part 111. This configuration enables the housing 10 to function as a vibration-isolating housing as will be discussed in more detail below.

Two battery-mounting parts 15, which are configured such that two rechargeable batteries (battery packs or battery cartridges) 19 can be respectively mounted thereon and dismounted (removed) therefrom, are provided on the lower-end side of the lower-side portion 135. In the present embodiment, the two battery-mounting parts 15 are aligned in the front-rear direction. Furthermore, the hammer drill 1 operates by using the electric power (current) supplied from the two batteries 19 mounted on the battery-mounting parts 15.

The detailed configuration of each portion of the hammer drill 1 is explained below, with reference to FIG. 1 to FIG. 6.

Figure 3:
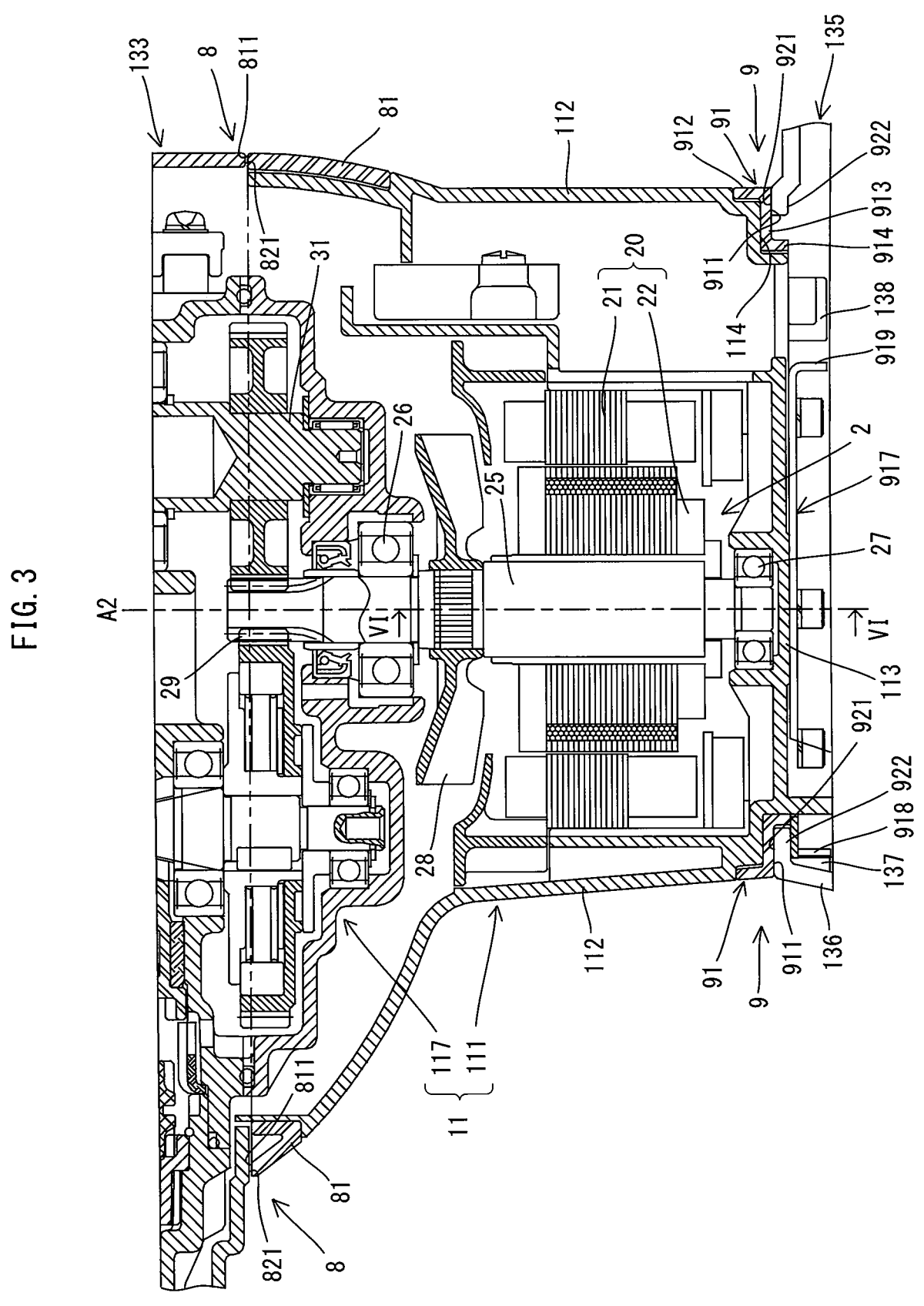

First, the internal structure of the motor-housing part 111 will be explained, with reference to FIG. 3. The motor-housing part 111 has (is formed into) generally rectangular-tube shape with a closed lower side (bottom) and an open upper side. As shown in FIG. 3, the drive-mechanism housing part 117 is coupled and fixed to, and is incapable of relative movement with respect to, the motor-housing part 111 with a lower-end portion of a rear-side portion of the drive-mechanism housing part 117 disposed inside the upper-end portion of the motor-housing part 111. In the present embodiment, a compact, high-power brushless motor serves as the motor 2 and is housed in the motor-housing part 111. The motor 2 comprises: a motor-main-body part 20, which comprises a stator 21 and a rotor 22, and a motor shaft 25 that extends from and rotates together with the rotor 22. In the present embodiment, the motor-main-body part 20 is disposed spaced apart from the impact axis A1 in the lower-end portion of the motor-housing part 111. It is noted that, in the present embodiment, the ratio of the stack thickness T (in the up-down direction) of the stator 21 to the outer diameter $D_s$ of the stator 21 (in the front-rear direction) is set to the fraction ⅕ ($T/D_s$) or less (e.g., ⅙ or less, ⅐ or less or ⅛ or less; as an upper limit the ratio may be 1/10 or greater or ⅑ or greater; that is, the outer diameter of the stator 21 in the front-rear direction is preferably 5 times or greater, and preferably 10 times or less, than the stack thickness of the stator 21 in the up-down direction), and the diameter $D_r$ of the rotor 22 is greater than the stack thickness T of the stator 21. That is, the motor 2 is configured as a motor in which the thickness in the rotational axis A2 direction (up-down direction) is much smaller (less) than the diameter (i.e., a so-called flat or pancake motor). By using such a brushless flat motor, the length of the motor-housing part 111 in the rotational axis A2 direction (up-down direction) can be reduced. Alternatively, additional components can be included in the motor-housing part 111 without increasing the length of the motor-housing part 111 in the up-down direction. Thus, according to such a configuration, even though the lower-side portion 135 is disposed on the lower side of the motor-housing part 111 and, in turn, the batteries 19 are mounted downward of the lower-side portion 135, it is possible to prevent an increase in the size (overall height) of the hammer drill 1.

The motor shaft 25, which extends in the up-down direction, is rotatably supported by a first bearing 26, which is held by (in) the lower-end part of the drive-mechanism housing part 117, and by a second bearing 27, which is held by (in) the lower-end part of the motor-housing part 111. A fan 28 is provided for cooling the motor 2 and a (below-described) controller 5 and the fan 28 is fixed to the motor shaft 25 adjacent to the upper side of the motor-main-body part 20. The fan 28 is configured such that, by driving the motor 2, it rotates integrally with the motor shaft 25, and causes a cooling draft (air) to flow into the housing 10 via vents 139 (refer to FIG. 2), which are discussed below; this cooling draft passes (flows around) the periphery of the controller 5, and then passes (flows around) the periphery of the motor 2. It is noted that after this cooling draft flows past the periphery of the motor 2, it flows out to the outside of the housing 10 via vents 134 (refer to FIG. 1) provided as air-exhaust ports in side surfaces of the upper-side portion 133. The upper-end part of the motor shaft 25 projects into the drive-mechanism housing part 117, and a drive gear 29 is formed at the terminal end of the motor shaft 25.

Next, the internal structure of the drive-mechanism housing part 117 will be explained, with reference to FIG. 2. As discussed above, the drive mechanism 3 is housed in the drive-mechanism housing part 117. As shown in FIG. 2, the drive mechanism 3 of the present embodiment comprises a motion-converting mechanism 30, a hammer element 36, and a rotation-transmitting mechanism 38.

The motion-converting mechanism 30 is configured to convert the rotary motion of the motor 2 into linear motion and transmit such linear motion to the hammer element 36. The motion-converting mechanism 30 of the present embodiment is configured as a crank mechanism and comprises a crankshaft 31, a connecting rod 32, a piston 33, and a cylinder 35. The crankshaft 31 is disposed, parallel to the motor shaft 25, on a rear-end portion of the drive-mechanism housing part 117. The crankshaft 31 has a driven gear 311, which meshes with the drive gear 29, at a lower end thereof and has a crank pin 312 at an upper end thereof. One end of the connecting rod 32 is rotatably coupled to the crank pin 312, and the other end of the connecting rod 32 is attached to the piston 33 via a pin. The piston 33 is slidably disposed inside the circular-cylindrical cylinder 35. The cylinder 35 is coaxially coupled and fixed to a rear part of the tool holder 34, which is disposed inside the tip area of the drive-mechanism housing part 117. When the motor 2 is driven, the piston 33 moves reciprocatively in the impact axis A1 direction inside the cylinder 35.

The hammer element 36 comprises a striker 361 and an impact bolt 363. The striker 361 is disposed inside the cylinder 35 so as to be slidable in (along) the impact axis A1 direction. An air chamber 365 is formed between the striker 361 and the piston 33 and is provided for linearly moving the striker 361, which serves as a striking element, by using air-pressure fluctuations generated by the reciprocating motion of the piston 33. The impact bolt 363 is configured as an intermediate element, which transmits the kinetic energy of the striker 361 to the tool accessory 18, and is disposed inside the tool holder 34 so as to be slidable in the impact axis A1 direction.

When the motor 2 is driven and the piston 33 moves frontward, the air in the air chamber 365 becomes compressed, and thereby the internal pressure rises. Consequently, the striker 361 is pushed frontward at a high velocity and strikes the impact bolt 363, and thereby the kinetic energy is transmitted to the tool accessory 18. As a result, the tool accessory 18 is driven linearly along the impact axis A1 and strikes (impacts) the workpiece. On the other hand, when the piston 33 moves rearward, the air in the air chamber 365 expands and the internal pressure falls, and thereby the striker 361 is pulled rearward. The hammer drill 1 performs the hammering operation by repetitively performing such operations on (using) the motion-converting mechanism 30 and the hammer element 36 such that the tool accessory 18 is linearly driven in an oscillating manner.

The rotation-transmitting mechanism 38 is configured to transmit the rotational motive power of the motor shaft 25 to the tool holder 34. In the present embodiment, the rotation-transmitting mechanism 38 is configured as a gear-speed-reducing mechanism comprising a plurality of gears; the rotational motive power of the motor 2 is transmitted to the tool holder 34 after the rotational speed has been suitably reduced. It is noted that meshing-type clutches 39 are disposed along the motive-power-transmission pathway of the rotation-transmitting mechanism 38. When the clutches 39 are put into an engaged state, the rotational motive power of the motor shaft 25 is transmitted to the tool holder 34 by the rotation-transmitting mechanism 38, and thereby the tool accessory 18, which is mounted in the tool holder 34, is rotationally driven around the impact axis A1. On the other hand, when the engaged state of the clutches 39 is released (FIG. 2 shows the engagement-released state), the transmission of motive power by the rotation-transmitting mechanism 38 to the tool holder 34 is cut off and the tool accessory 18 is no longer rotationally driven.

The hammer drill 1 of the present embodiment is configured such that one of two modes (a hammer-drill mode and a hammer mode) is selectable by manipulating (manually turning) a mode-switching dial 391, which is provided on an upper side of the drive-mechanism housing part 117. In the hammer-drill mode, the clutches 39 are put into the engaged state and the motion-converting mechanism 30 and the rotation-transmitting mechanism 38 are driven, and thereby the hammering operation and the drill operation are both performed simultaneously on the tool accessory 18. In the hammer mode, the clutches 39 are put into the engagement-released state (i.e. the disengaged state) and only the motion-converting mechanism 30 is driven such that only the hammering operation is performed. Because configurations for such mode switching are well known, a detailed explanation thereof is omitted herein.

The internal structure of the second housing part 13 is explained below, with reference to FIGS. 1, 2, and 4. First, the upper-side portion 133 will be explained. As shown in FIGS. 1 and 2, the rear-side portion of the upper-side portion 133 has (is formed into) substantially a rectangular-box shape, in which the lower side is open, and the rear-side portion covers a rear-side portion of the drive-mechanism housing part 117 (more specifically, the portion in which the motion-converting mechanism 30 and the rotation-transmitting mechanism 38 are housed) from above. In addition, a front-side portion of the upper-side portion 133 has (is formed into) a circular-cylindrical shape and covers the outer circumference of a front-side portion of the drive-mechanism housing part 117 (more specifically, the portion in which the tool holder 34 is housed).

The grasp part (handle) 131 will now be explained. As shown in FIG. 2, a trigger 14 that can be pressed (squeezed) by the user is provided on a front side of the grasp part 131. A switch unit 140, which is switchable to an ON state or to an OFF state in accordance with the manipulation (pressing) of the trigger 14, is provided in the interior of the grasp part 131, which has (is formed into) a tubular shape. Although the details are not illustrated because it is a well-known configuration, the switch unit 140 includes: a plunger, which moves in a linked manner with the pressing of the trigger 14; a motor switch; and an illumination switch.

Each switch comprises a fixed contact and a movable contact. In an initial state in which the trigger 14 is not being pressed, each switch is maintained in the OFF (open) state. On the other hand, when the trigger 14 is pressed, the plunger is caused to move, thereby causing the movable contact to be brought into contact with the fixed contact, whereby the switch transitions to the ON (closed) state. It is noted that, in the present embodiment, while the trigger 14 is being pressed (squeezed) from its released (un-pressed) position to its maximum depressed position, the movable contact of the illumination switch makes contact with the fixed contact of the illumination switch before the trigger 14 reaches its maximum depressed position, such that an illumination unit 6 (described below) is lit. On the other hand, only when the trigger 14 has reached its maximum depressed position, the movable contact of the motor switch first makes contact with the fixed contact of the motor switch. Thus, contact actuation times for each switch are set via the plunger.

The switch unit 140 is electrically connected to the controller 5, which is discussed below, by wiring (not shown). The ON-OFF states of the motor switch and the illumination switch are used by the controller 5 to control the start and stop of the supply of electric current to the motor 2 and to control the turning ON and OFF of the illumination unit 6.

The lower-side portion 135 will now be explained. As shown in FIG. 1 and FIG. 2, the lower-side portion 135 has (is formed into) a rectangular-box shape, the upper side of which is partially open, and is disposed on the lower side of the motor-housing part 111. As discussed above, the two battery-mounting parts 15, which are aligned in the front-rear direction, are provided on the lower-end side of the lower-side portion 135 of the second housing part 13. The batteries 19 are mounted on the lower side of the battery-mounting parts 15.

The configuration of the batteries 19, which are capable of being mounted onto and dismounted (removed) from the battery-mounting parts 15, will now be explained briefly. As shown in FIGS. 1, 2, and 4, each battery (battery pack or battery cartridge) 19 has (is formed into) substantially a rectangular-parallelepiped shape and comprises a hook 193, terminals (not shown), and a pair of guide grooves 191. It is noted that, for the sake of convenience in the explanation, the direction of each battery 19 is defined as the up-down direction in the state in which the battery 19 is mounted on the hammer drill 1. A plurality of battery cells (not shown) are housed within a hard resin case and the battery cells are electrically connected to battery terminals disposed on the upper surface of the battery 19 between the guide grooves 191 in well-known manner. One or more communication terminals for communicating with a controller (e.g., microprocessor) and/or other electrical elements (e.g., temperature sensor) located within the battery 19 may also be provided between the guide grooves 191 in well-known manner.

The hook 193 and the terminals are provided on the upper side of each battery 19, and the upper side opposes the corresponding battery-mounting part 15. The hook 193 is configured such that one-end part in the longitudinal direction of the battery 19 (i.e., the left-right direction in FIG. 2, and the direction orthogonal to the paper surface in FIG. 4) is biased by a spring (not shown) such that the one-end part normally protrudes upward from the upper surface of the battery 19 and such that the hook 193 is pulled in downward from the upper surface by pressing a button 195. The terminals are provided on the upper side of the battery 19 adjacent the hook 193. The two guide grooves 191 are formed as grooves, extending linearly in the longitudinal direction, on the upper parts of two side surfaces disposed along the longitudinal direction of the battery 19.

In the present embodiment, the two battery-mounting parts 15 are a front-side, battery-mounting part 15 that is provided on the front-side portion of the lower-side portion 135, and a rear-side, battery-mounting part 15 that is provided on the rear-side portion of the lower-side portion 135. It is noted that the front-side battery-mounting part 15 is disposed downward of the motor 2 and is intersected by the rotational axis A2. As shown in FIGS. 2 and 4, each of the battery-mounting parts 15 is provided with guide rails 151, a hook-engaging part 153, and battery-connection terminals 155.

The guide rails 151 protrude inward from left and right wall surfaces along a lower end of the lower-side portion 135 and are formed as projections extending linearly in the front-rear direction (i.e., the impact axis A1 direction). The guide rails 151 are configured such that they can engage, by sliding, with the guide grooves 191 of the battery 19. The hook-engaging part 153 is a recessed part that is recessed upward and is configured such that the hook 193 of the battery 19 can engage therewith. The battery-connection terminals 155 are configured such that they respectively electrically connect with the terminals of the battery 19 attendant with the battery 19 being fixed to the battery-mounting part 15 by the hook 193 engaging with the hook-engaging part 153.

In the present embodiment, the front-side, battery-mounting part 15 and the rear-side, battery-mounting part 15 have identical configurations but differ in the direction in which the batteries 19 are mounted and dismounted. Specifically, the front-side, battery-mounting part 15 is configured such that the battery 19 engages therewith by sliding from the front toward the rear in the state in which the hook 193 is disposed at the front-upper-end part and the guide rails 151 are engaged with the guide grooves 191. Consequently, it is configured such that the hook-engaging part 153 is disposed on the front-end part of the battery-mounting part 15, and the battery-connection terminals 155 connect, from (at) the rear, to the terminals of the battery 19. On the other hand, the rear-side, battery-mounting part 15 is configured such that the battery 19 engages therewith by sliding from the rear toward the front in the state in which the hook 193 is disposed at the rear-upper-end part and the guide rails 151 are engaged with the guide grooves 191. Consequently, it is configured such that the hook-engaging part 153 is disposed at the rear-end part of the battery-mounting part 15, and the battery-connection terminals 155 connect, from (at) the front, to the terminals of the battery 19.

Thus, the front-side, battery-mounting part 15 is configured such that the battery 19 is mounted by sliding it from the front toward the rear, and the rear-side, battery-mounting part 15 is configured such that the battery 19 is mounted by sliding it from the rear toward the front. Therefore, the (e.g., front) battery 19 mounted on one of the battery-mounting parts 15 does not interfere with the (e.g., rear) battery 19 mounted on the other battery-mounting part 15 during mounting or dismounting of either of the batteries 19. Thereby, ease of operation can be satisfactorily maintained during mounting or dismounting (removal) of the two batteries 19.

It is noted that the respective guide rails 151 of the front-side, battery-mounting part 15 and the rear-side, battery-mounting part 15 are disposed along the same two virtual straight lines extending horizontally in the front-rear direction. That is, the two battery-mounting parts 15 are aligned in one row in the front-rear direction at the same position in the up-down direction.

As shown in FIG. 2, because the two battery-mounting parts 15 are configured in this manner and are provided on the lower-end part of the lower-side portion 135 such that they are aligned in the front-rear direction, a space 150 is formed in the front-rear direction between the two sets of battery-connection terminals 155. In the area of the lower-side portion 135 covering the space 150 (more specifically, a circumferential-wall part 136 of the lower-side portion 135), three of the vents 139 are formed and enable the interior and exterior of the lower-side portion 135 to communicate with each other. In the present embodiment, three of the vents 139 are provided in both the left and right wall parts covering the space 150. In addition, the vents 139 function as inflow ports for the cooling draft.

As shown in FIGS. 1 and 2, the illumination unit 6 is provided on the front-end part (side) of the lower-side portion 135. The illumination unit 6 of the present embodiment principally comprises one or more light-emitting diodes (LED), which serve(s) as a light source, and a case, which is made of a translucent material (e.g., a transparent resin, glass, or the like) and houses the LED(s). In the illumination unit 6, the illumination direction of the light emitted by the LED(s) is set so that the location at which the tool accessory 18 performs work (i.e. the portion of the workpiece to be processed and/or the tip portion of the tool accessory 18) is illuminated.

Furthermore, as shown in FIG. 2, the controller 5 for controlling the operation of the hammer drill 1 is housed in the lower-side portion 135. In the present embodiment, the controller 5 is configured as a control apparatus of the motor 2, which is a brushless motor. More specifically, the controller 5 is configured as a circuit board having a control circuit (e.g., a microcomputer comprising a CPU, memory, and the like), an inverter circuit, and the like mounted thereon. It is noted that, in the present embodiment, the controller 5 also functions as the control apparatus of the illumination unit 6.

The controller 5 is disposed adjacent the space 150 formed between the two sets of battery-connection terminals 155 and such that at least part(s) of the controller 5 overlap(s) the two battery-mounting parts 15 in the front-rear direction. More specifically, the controller 5 is disposed upward of the space 150 and is disposed such that, when viewed from above (or below), a center part of the controller 5 overlaps the space 150; furthermore, the front-end part and rear-end part of the controller 5 partially overlap the front-side, battery-mounting part 15 and the rear-side, battery-mounting part 15, respectively. In addition, the controller 5 comprises wiring terminals 51, to which wiring (not shown) is connected for electrically connecting the controller 5 to the motor 2, the illumination unit 6, the switch unit 140, etc. The controller 5 is disposed such that the wiring terminals 51 project toward the space 150 below.

In the present embodiment, when the trigger 14 is pressed and the illumination switch of the switch unit 140 changes from the normal OFF state to the ON state, the controller 5 turns the LED(s) of the illumination unit 6 ON in response to an ON signal output from the illumination switch. When the trigger 14 is further pressed to its maximum depressed position such that the motor switch changes to the ON state, the controller 5 supplies electric current to drive the motor 2 in response to the outputted ON signal. It is noted that, as discussed above, the contact actuation times of the illumination switch and the motor switch differ, and therefore the illumination unit 6 turns ON before the drive of the motor 2 starts and turns OFF after the drive of the motor 2 stops.

Further details concerning the vibration-isolating structure of the housing 10 are explained below, with reference to FIGS. 2 to 6. As discussed above, in the housing 10, the second housing part 13 that includes the grasp part 131 is elastically coupled to the first housing part 11 that houses the motor 2 and the drive mechanism 3, and thereby the transmission of vibration from the first housing part 11 to the second housing part 13 (specifically, to the grasp part 131) is reduced because the first housing part 11 can oscillate relative to the second housing part 13 in response to vibration generated in the first housing part 11 during operation of the hammer drill 1.

More specifically, as shown in FIG. 2, a pair of left and right first springs 71 is disposed between the drive-mechanism housing part 117 of the first housing part 11 and the upper-side portion 133 of the second housing part 13. It is noted that, in FIG. 2, only the right-side first spring 71 is shown, but the configuration of the left-side first spring 71 is the same as the right-side one. Furthermore, a second spring 75 is disposed between the motor-housing part 111 of the first housing part 11 and the lower-side portion 135 of the second housing part 13. That is, the first housing part 11 and the second housing part 13 are elastically coupled, via the first springs 71 and the second spring 75, at both the upper-end-part side and the lower-end-part side of the grasp part 131, respectively. In addition to these springs, an O-ring 79, which is formed as an elastic member, is disposed such that it is interposed between the front-end part of the drive-mechanism housing part 117 and the circular-cylindrical front-side portion of the upper-side portion 133.

Further details concerning the arrangement of the first springs 71 will now be explained. As shown in FIGS. 2 and 4, a plate member 72 is fixed by screws to the rear-end part of the drive-mechanism housing part 117. A pair of left and right spring-seat parts 73 is provided on an upper-end part of a rear surface of the plate member 72. The spring-seat parts 73 each have a circular-column part that protrudes rearward. In addition, a pair of left and right spring-seat parts 74 is provided on the rear-end part of the upper-side portion 133; the rear-end part is disposed rearward of the spring-seat parts 73. The spring-seat parts 74 each have a circular-column part that protrudes frontward.

In the present embodiment, compression coil springs are used as the first springs 71. The first springs 71 are resiliently (elastically) disposed between the spring-seat parts 74, 73, in the state in which opposite end parts of the first springs 71 are externally mounted on (are mounted around the exterior sides of) the circular-column parts of the spring-seat parts 74, 73, such that the central axes (longitudinal extensions) of the first springs 71 extend in parallel to the impact axis A1 (i.e., in the front-rear direction). The first springs 71 bias (urge) the first housing part 11 (the drive-mechanism housing part 117) away from the second housing part 13 (the upper-side portion 133) i.e., such that the grasp part 131 spaces apart from the first housing part 11. In other words, the first springs 71 bias (urge) the first housing part 11 frontward in the front-rear direction, which is the impact axis A1 direction, and bias (urge) the second housing part 13, which includes the grasp part 131, rearward.

Figure 5:
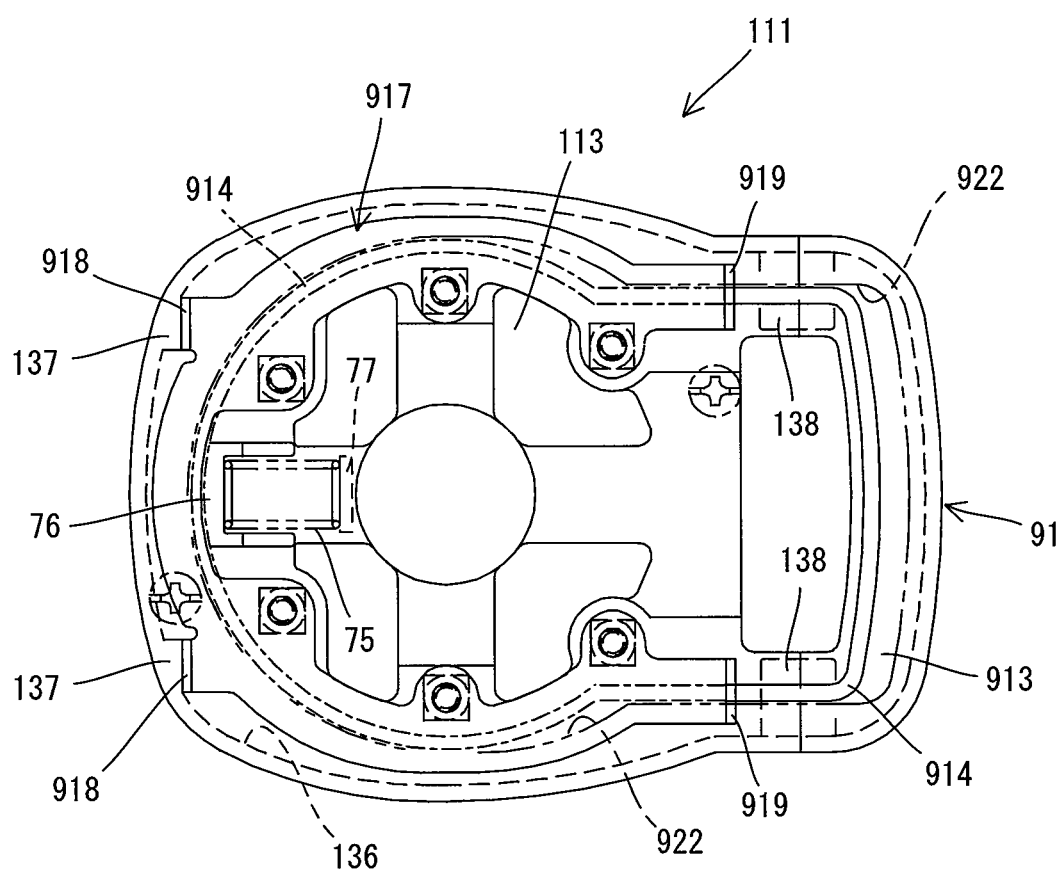
FIG. 5 is a bottom view of the motor-housing part.

Further details concerning the arrangement of the second spring 75 will now be explained. As shown in FIGS. 2 and 5, a spring-seat part 76 protrudes downward from a center part of a front-lower-end part of the motor-housing part 111. The spring-seat part 76 includes a front-wall part and left and right sidewall parts; a rear side of the spring-seat part 76 is open. In addition, a spring-seat part 77 is provided on the lower-side portion 135 and is formed as a recessed part whose front side is open; the spring-seat part 77 is disposed on the rear side of the spring-seat part 76. In the present embodiment, the second spring 75 likewise is a compression coil spring. The second spring 75 is resiliently (elastically) disposed between the spring-seat parts 76, 77, such that one end part of the second spring 75 contacts the rear surface of the spring-seat part 76 and the other (opposite) end part of the second spring 75 contacts the front surface of the spring-seat part 77, and such that the central axis (longitudinal extension) of the second spring 75 extends in parallel to the impact axis A1 (i.e., in the front-rear direction). The second spring 75 biases (urges) the first housing part 11 (the motor-housing part 111) away from the second housing part 13 (the lower-side portion 135), i.e., such that the grasp part 131 spaces apart from the first housing part 11. That is, similar to the first springs 71, the second spring 75 likewise biases the first housing part 11 frontward and biases the second housing part 13 rearward.

Furthermore, sliding-guide structures are provided in (on) the housing 10 to support and guide sliding movement of the first housing part 11 relative to the second housing part 13 during operation (i.e. when vibration is being generated in the first housing part 11). In the present embodiment, an upper-side guide part 8 and a lower-side guide part 9 are provided as the sliding-guide structures at two locations, that is, on the upper side and on the lower side of the motor-main-body part 20.

First, the configuration of the upper-side guide part 8 will be explained in more detail, with reference to FIGS. 3 and 4. As shown in FIG. 3, the motor-housing part 111, has a bottomed, rectangular-tube shape, and comprises: a circumferential-wall part 112, which circumferentially surrounds the motor 2; and a bottom part 113, which is connected to a lower end of the circumferential-wall part 112 and forms the lower-end part of the motor-housing part 111. It is noted that a step part 114 is formed at an outer-edge part of the bottom part 113 and the step part 114 forms a recess that extends upward of the center part of the bottom part 113. An upper-side sliding part 81 is formed as a structural member (discrete piece) that is separate from the circumferential-wall part 112 and has substantially a rectangular-frame (box) shape. The upper-side sliding part 81 is mounted on (around) the outer circumference of the upper-end portion of the circumferential-wall part 112. That is, the upper-side sliding part 81 extends in a loop-shape or closed-curve shape continuously around the upper portion of the circumferential-wall part 112. The upper surface of the upper-side sliding part 81 is a flat surface parallel to the impact axis A1 (i.e., a flat surface whose normal line is orthogonal to the impact axis A1) and constitutes a first upper-side sliding surface 811. It is noted that, in the present embodiment, the first upper-side sliding surface 811 is a flat surface extending in the horizontal direction (i.e., a flat surface having a normal line that is orthogonal to the impact axis A1 and that is parallel to the rotational axis A2 of the motor shaft 25).

Opposite thereto, a lower surface of an opening (a lower-end part) of the upper-side portion 133 likewise is a flat surface parallel to the impact axis A1 (i.e., a flat surface whose normal line is orthogonal to the impact axis A1) and constitutes a second upper-side sliding surface 821. In the present embodiment, the second upper-side sliding surface 821 likewise is a flat surface extending in the horizontal direction, and the first upper-side sliding surface 811 is slidable relative to the second upper-side sliding surface 821 in the state in which those surfaces 811, 821 abut and contact one another (i.e. the first upper-side sliding surface 811 is in sliding contact with the second upper-side sliding surface 821). The first upper-side sliding surface 811 and the second upper-side sliding surface 821 constitute the upper-side guide part 8.

The upper-side sliding part 81, which has the first upper-side sliding surface 811, is preferably formed of a material that differs from at least the material of the upper-side portion 133, which has the second upper-side sliding surface 821. In the present embodiment, the second housing part 13 (the grasp part 131, the upper-side portion 133, and the lower-side portion 135) and the circumferential-wall part 112 and the bottom part 113 of the motor-housing part 111 are all formed of a polyamide-based resin, e.g., containing glass fibers (e.g., 20-35 weight percent) and other additives typically utilized in power tool housings; a polyamide-based resin preferably contains at least 50% weight percent of polyamide, e.g., PA66, of its total weight (i.e. 100 weight percent). The upper-side sliding part 81, on the other hand, is formed of a polycarbonate-based resin, e.g., containing glass fibers (e.g., 20-35 weight percent) and other additives typically utilized in power tool housings; a polycarbonate-based resin preferably contains at least 50% weight percent of polycarbonate of its total weight (i.e. 100 weight percent).

Figure 4:
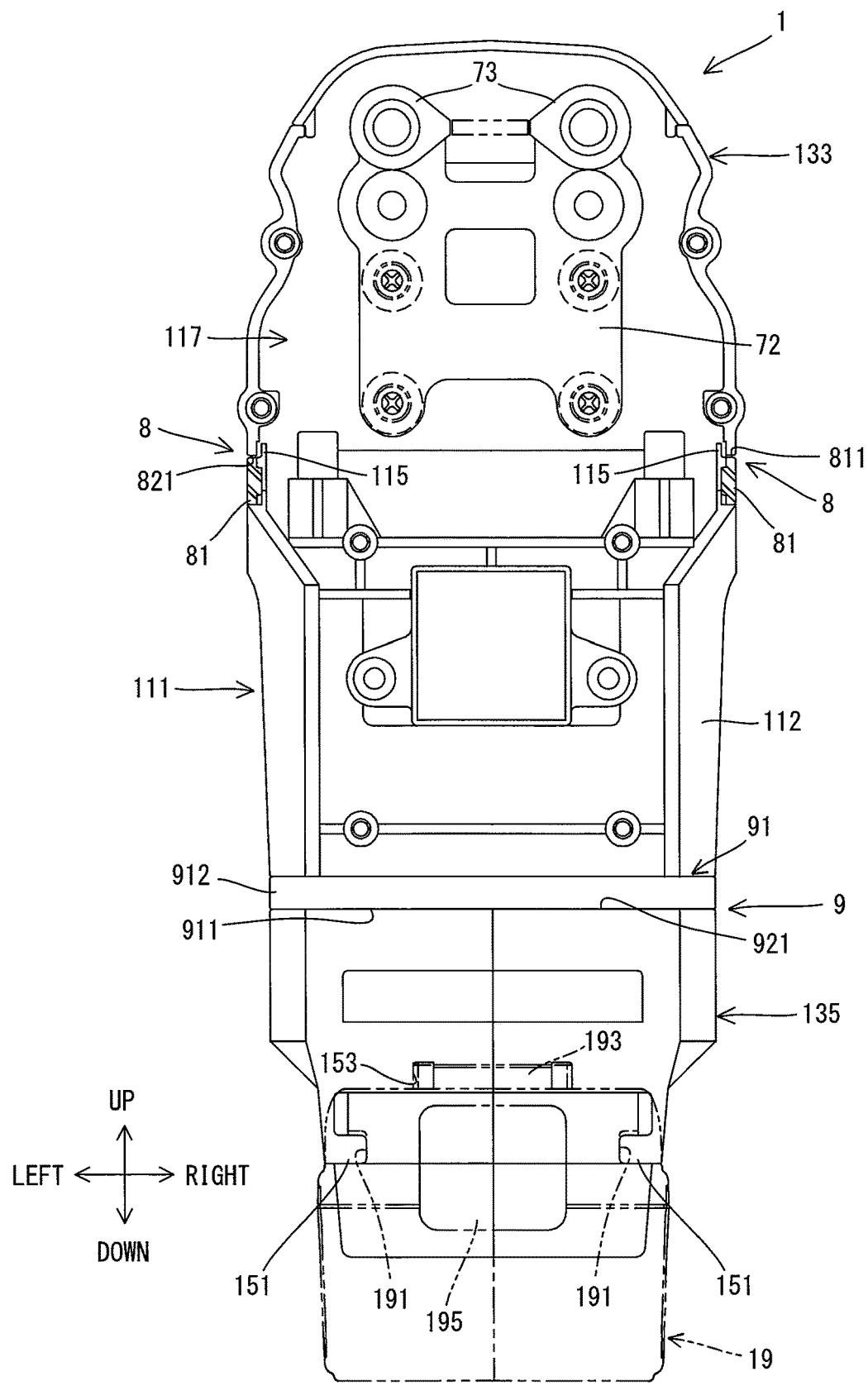
FIG. 4 is an explanatory diagram that shows a rear view of the internal structure of the hammer drill in the state in which part of the housing has been removed.

It is noted that, as shown in FIG. 4, the portions of the circumferential-wall part 112 constituting the left and right wall parts respectively each comprise a guide part 115 that projects upward more than the upper-side sliding part 81, which is mounted on (around) the outer circumference of the circumferential-wall part 112. The guide parts 115 of the circumferential-wall part 112 are disposed inward of the lower-end part of the upper-side portion 133. Therefore, when the first upper-side sliding surface 811 slides back and forth relative to the second upper-side sliding surface 821 because the upper-side portion 133 is moving (oscillating) relative to the motor-housing part 111 as a result of vibrations generated in the motor-housing part 111 during operation, the guide parts 115 prohibit (block) the upper-side portion 133 from moving in the left-right direction relative to the motor-housing part 111 and guide the upper-side portion 133 such that it moves (slides) back and forth only in the impact axis A1 direction. Consequently, in the present embodiment, the first upper-side sliding surface 811 and the second upper-side sliding surface 821 slide relative to each other in (along) the impact axis A1 direction (the front-rear direction) in the state in which they are in contact with one another.

The configuration of the lower-side guide part 9 will now be explained, with reference to FIG. 2 to FIG. 6. The same as in the upper-side guide part 8, the lower-side guide part 9 comprises a first lower-side sliding surface 911, which is formed on a lower-side sliding part 91 of the motor-housing part 111, and a second lower-side sliding surface 921, which is formed on the lower-side portion 135.

Figure 6:
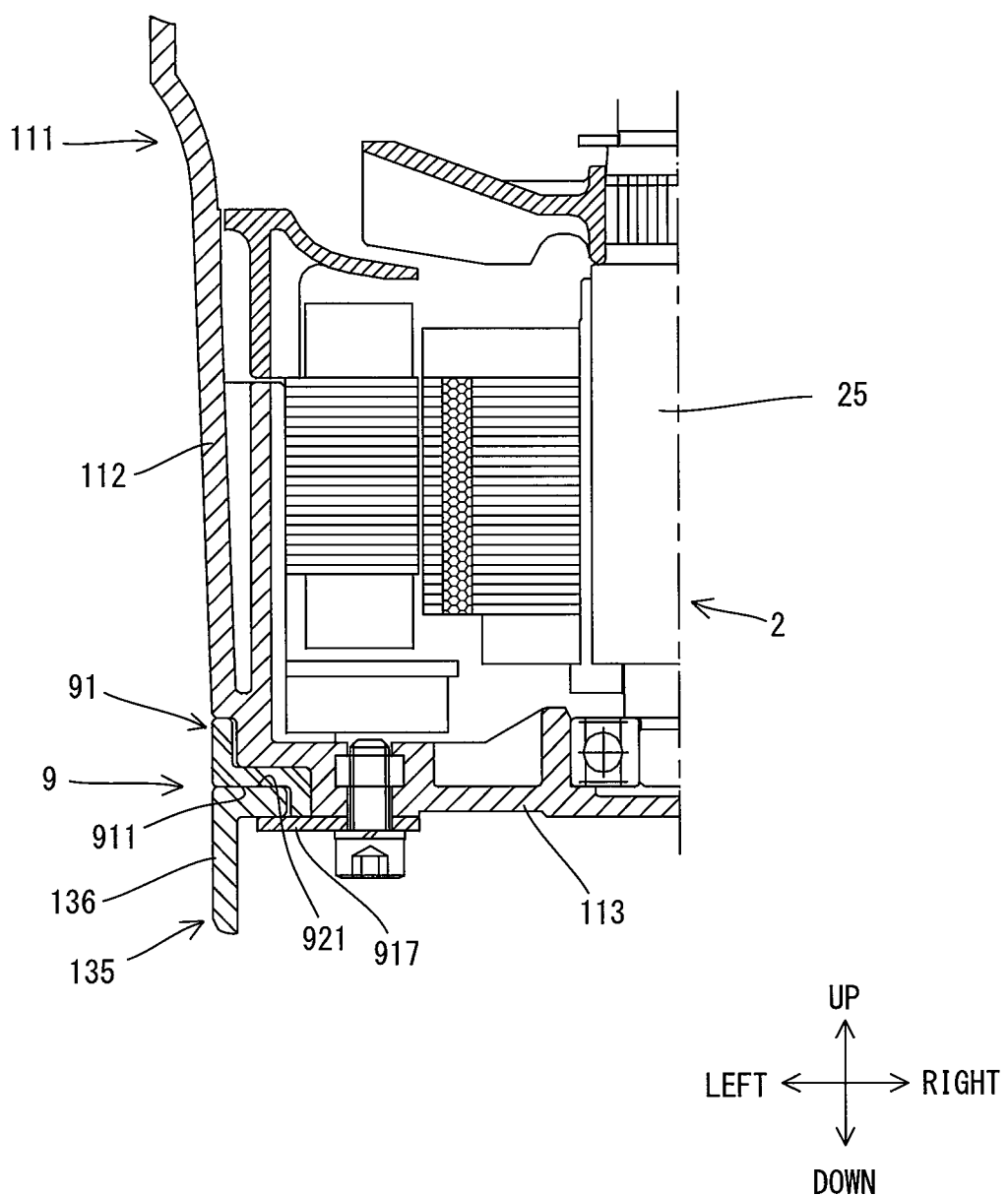
FIG. 6 is a cross-sectional view taken along line VI-VI in FIG. 3.

As shown in FIGS. 3 and 6, the lower-side sliding part 91 is mounted on (around) the outer circumference of the lower-end part of the circumferential-wall part 112 of the motor-housing part 111. The lower-side sliding part 91 comprises an outer-circumferential part 912, an outer-edge part 913, and a protruding part 914. The outer-circumferential part 912 has (is formed into) a rectangular-frame shape (loop shape or closed shape) and is mounted on (around) the outer circumference of the circumferential-wall part 112. The outer-edge part 913 protrudes inward from the outer-circumferential part 912 along (and follows) the step part 114, which is formed on the outer-edge part of the bottom part 113. The protruding part 914 protrudes downward from an inner-side end of the outer-edge part 913 to substantially the same position as the center part of the bottom part 113. The lower surface of the outer-edge part 913 is a flat surface parallel to the impact axis A1 (i.e., a flat surface whose normal line is orthogonal to the impact axis A1) and constitutes the first lower-side sliding surface 911. It is noted that, in the present embodiment, the first lower-side sliding surface 911 is a flat surface extending in the horizontal direction.

In addition, the lower-side sliding part 91 is formed of a material that differs from at least the material of the lower-side portion 135. In the present embodiment, the lower-side sliding part 91 is preferably formed of a polycarbonate-based resin, e.g., the same as in the upper-side sliding part 81.

As shown in FIGS. 3, 5, and 6, a plate member 917 is fixed to the bottom part 113 such that the plate member 917 opposes the outer-edge part 913 of the lower-side sliding part 91. In the present embodiment, the plate member 917 is configured as a substantially U-shaped metal plate whose rear side is open, and the plate member 917 is fixed by screws to the bottom part 113 from below such that the plate member 917 opposes the outer-edge part 913. A gap is formed in the up-down direction between the first lower-side sliding surface 911, which is the lower surface of the outer-edge part 913, and the upper surface of the plate member 917.

In addition, as shown in FIGS. 3 and 5, a pair of left and right forward-stop parts 918 and a pair of left and right rearward-stop parts 919 are provided on the plate member 917. The forward-stop parts 918 and the rearward-stop parts 919 are each formed by bending a part of the plate member 917 downward. The forward-stop parts 918 and the rearward-stop parts 919 cooperate with front-contact parts 137 and rear-contact parts 138, which are discussed below, and are configured to prohibit (block) the sliding movement of the lower-side portion 135 relative to the motor-housing part 111 beyond a prescribed range in the impact axis A1 direction (i.e., the front-rear direction).

As shown in FIGS. 3, 5, and 6, an interposed part (plain linear bearing or linear motion guide) 922 protrudes from the circumferential-wall part 136 of the lower-side portion 135 toward the interior (toward the rotational axis A2 of the motor 2), and is formed at (along) the opening (the upper-end part) of the lower-side portion 135. It is noted that FIG. 5 is a bottom view of the motor-housing part 111; however, for the sake of convenience in the explanation, an inner surface of the circumferential-wall part 136 of the lower-side portion 135 is indicated by a broken line and the interior-most edge (protruding edge) of the interposed part 922 is indicated by a chain double-dashed line.

At least one portion of the interposed part 922 (more specifically, at least one portion other than at a rear part of the second housing 13) is disposed in the gap between the first lower-side sliding surface 911 and the upper surface of the plate member 917 and is configured to be slidable relative to the motor-housing part 111. The thickness of the interposed part 922 in the up-down direction is substantially the same as the distance (gap) between the first lower-side sliding surface 911 and the upper surface of the plate member 917.

More preferably, the thickness of the interposed part 922 is set to be slightly less than the vertical height of the gap so that the interposed part 922 may freely slide relative to the first lower-side sliding surface 911 and the upper surface of the plate member 917 (i.e. such that the interposed part 922 is not press-fit into the gap). On the other hand, the thickness of the interposed part 922 is also preferably set to be sufficiently wide (high) so that movement of the interposed part 922 relative to the first lower-side sliding surface 911 and the upper surface of the plate member 917 in the vertical direction (in the direction of the rotational axis A2) is at least substantially blocked, thereby constraining the sliding movement of the first lower-side sliding surface 911 relative to the second lower-side sliding surface 921 to only a direction perpendicular to the rotational axis A2. By setting the thickness of the interposed part 922 in the vertical direction in this manner, the interposed part 922 acts or functions as a linear motion guide or plain linear bearing to permit movement of the first lower-side sliding surface 911 relative to the second lower-side sliding surface 921 only in a direction perpendicular to the rotational axis A2. While the interposed part 922 preferably is smooth to minimize friction, it need not function as a friction-reducing element.

The upper surface of the interposed part 922 is a flat surface parallel to the impact axis A1 (i.e., a flat surface whose normal line is orthogonal to the impact axis A1) and constitutes the second lower-side sliding surface 921. It is noted that, in the present embodiment, the second lower-side sliding surface 921 likewise is a flat surface extending in the horizontal direction. The first lower-side sliding surface 911 and the second lower-side sliding surface 921 are slidable in the state in which they abut and are in contact with one another.

When the first lower-side sliding surface 911 slides back and forth relative to the second lower-side sliding surface 921 because the lower-side portion 135 is moving (oscillating) relative to the motor-housing part 111 as a result of vibrations generated in the motor-housing part 111 during operation, a left-side portion and a right-side portion make contact with the interposed part 922 and thereby the protruding part 914 of the lower-side sliding part 91 prohibits (blocks) movement of the lower-side portion 135 in the left-right direction with respect to the motor-housing part 111 and guides the lower-side portion 135 such that it moves in (only along) the impact axis A1 direction, i.e. movement of the first lower-side sliding surface 911 relative to the second lower-side sliding surface 921 is constrained to being substantially one-dimensional movement in parallel to the impact axis A1. Consequently, in the present embodiment, the first lower-side sliding surface 911 slides back and forth relative to the second lower-side sliding surface 921 substantially only in the impact axis A1 direction (the front-rear direction) in the state in which they are in contact with one another, such that the interposed part 922 functions or acts as a plain linear bearing or linear motion guide in this respect as well.

It is noted that, in the present embodiment, the interposed part 922 extends continuously around three sides (front, left and right) of the motor housing 112, e.g., in a substantially U-shape, C-shape, oval shape or horseshoe shape. However, the shape of the interposed part 922 may be modified in various ways while still satisfying the requirements of blocking or preventing movement of the first lower-side sliding surface 911 relative to the second lower-side sliding surface 921 in the vertical (up-down) direction and/or in the lateral (left-right) direction of the power tool 1. For example, the interposed part 922 may have breaks or interruptions along its curved extension and/or one or more portions of the interior-most edge of the interposed part 922 may be straight. In addition or in the alternative, the interposed part 922 may be provided only at the longitudinal front portion of the second portion 135 of the second housing 13, such that it only blocks or prohibits movement of the first lower-side sliding surface 911 relative to the second lower-side sliding surface 921 in the vertical direction. Another structure optionally may be provided to block movement of the first lower-side sliding surface 911 relative to the second lower-side sliding surface 921 in the lateral direction, if desired. Moreover, the interposed part 922 may be provided only along the left and right side portions of the second portion 135 of the second housing 13 (i.e. no interposed part 922 is provided at the longitudinal front portion of the second portion 135), such that the pair of left, right interposed parts 922 still blocks movement of the first lower-side sliding surface 911 relative to the second lower-side sliding surface 921 in both the vertical and horizontal directions, or in only one of these directions. Various other modifications are possible as long as a linear motion guiding function is provided such that movement of the first lower-side sliding surface 911 relative to the second lower-side sliding surface 921 is blocked/prohibited in the vertical direction and/or movement of the first lower-side sliding surface 911 relative to the second lower-side sliding surface is blocked/prohibited 921 in the lateral direction.

As shown in FIGS. 3 and 5, the left and right front-contact parts 137, which protrude rearward, are provided on the front-upper-end part of the circumferential-wall part 136 of the lower-side portion 135. In addition, the left and right rear-contact parts 138, which protrude toward the interior of the lower-side portion 135, are provided on the rear-upper-end part of the circumferential-wall part 136 of the lower-side portion 135. The front-contact parts 137 are configured such that they are capable of making contact with the front surfaces of the forward-stop parts 918. The rear-contact parts 138 are configured such that they are capable of making contact with the rear surfaces of the rearward-stop parts 919. The front-contact parts 137 and the rear-contact parts 138 cooperate with the forward-stop parts 918 and the rearward-stop parts 919 and are configured to prohibit (block) the sliding movement of the lower-side portion 135 relative to the motor-housing part 111 beyond a prescribed range in the impact axis A1 direction (i.e., the front-rear direction). This prescribed range or upper limit of sliding movement may be, e.g., at least 2 mm, more preferably at least 3 mm, and even more preferably at least 3.5 mm, and may be, e.g., 6 mm or less, preferably 5 mm or less, and even more preferably 4.5 mm or less. The prescribed range may be determined, e.g., as follows. When the power tool 1 is not in use, the first and second springs 71, 75 urge (push) the first housing part 11 away from the second housing part 13 such that the forward-stop parts 918 contact the front-contact parts 137. At this time, the rear-contact parts 138 will be spaced apart from the rear surfaces of the rearward-stop parts 919 such that a gap is present between the rear-contact parts 138 and the rearward-stop parts 919, as shown in FIGS. 3 and 5. This gap corresponds to the above-mentioned prescribed range (sliding range) of the sliding movement of the first housing part 11 relative to the second housing part 13, because it is the maximum distance that the front housing part 11 can move (slide) relative to the second housing part 13 before the rear-contact parts 138 contact the rearward-stop parts 919 and block further relative movement (relative sliding movement). However, the prescribed sliding range of the front housing part 11 relative to the second housing part 13 may be determined in other ways, as long as the front housing part 11 is slidable relative to the second housing part by the above-mentioned distances (lengths).

The functions and effects of the hammer drill 1 configured as described above will now be explained. As discussed above, the first housing part 11 and the second housing part 13 are biased frontward and rearward away from each other by the first springs 71 and the second spring 75. Thereby, as shown in FIGS. 2 and 3, the forward-stop parts 918 of the plate member 917 are in contact with the rear surfaces of the front-contact parts 137 in the initial state prior to the start of processing work. That is, by virtue of the front-contact parts 137 making contact with the forward-stop parts 918, the initial arrangement (relative positional relationship) of the lower-side portion 135 relative to the motor-housing part 111 is defined. As shown in FIGS. 2 and 4, when the hammer drill 1 is in the (its) initial state, the first upper-side sliding surface 811 contacts the second upper-side sliding surface 821 around the entire circumference of the motor-housing part 111.

When the user presses the trigger 14 to its motor-actuation position, the drive of the motor 2 starts. Vibration arises in the hammer drill 1 (more particularly, in the first housing part 11) owing to the drive of the motor 2 and the drive mechanism 3. In the present embodiment, the second housing part 13 (comprising the grasp part 131 that is grasped by the user) is coupled to, and is capable of relative movement with respect to, the first housing part 11 (housing the motor 2 and the drive mechanism 3 that constitute the sources of the vibration) via the first springs 71 and the second spring 75. Thereby, the oscillating sliding movement of the first housing part 11 relative to the second housing part 13, which is effected by the springs 71, 75, makes it is possible to reduce the transmission of vibration from the first housing part 11 to the second housing part 13 (specifically, the grasp part 131).

In particular, in the present embodiment, the first springs 71 and the second spring 75 are composed of compression coil springs that bias the first housing part 11 away from the second housing part 13 such that the grasp part 131 is spaced apart from the first housing part 11. Furthermore, the first housing part 11 and the second housing part 13 are coupled, via the first springs 71 and second spring 75, at both ends of the grasp part 131. Thereby, the transmission of vibration from the first housing part 11 to the grasp part 131 can be more effectively reduced.

In addition, the upper-side sliding part 81 and the lower-side sliding part 91, which are configured to be slidable relative to the upper-side portion 133 and the lower-side portion 135 of the second housing part 13, respectively, are provided at two locations of the first housing part 11. More specifically, the upper-side sliding part 81 and the lower-side sliding part 91 are disposed on both (opposite) sides of the motor-main-body part 20 in the rotational axis A2 direction of the motor shaft 25. Thereby, the stability of the oscillating sliding of the first housing part 11 relative to the second housing part 13 when the first housing part 11 moves (slides) relative to the second housing part 13 can be increased more than in embodiments in which a sliding-guide structure is provided at only one location, such as on only one side of the motor-main-body part 20.

The lower-side sliding part 91 has the first lower-side sliding surface 911, which is a flat surface parallel to the impact axis A1. The first lower-side sliding surface 911 is slidable in the impact axis A1 direction (the front-rear direction) in the state in which the first lower-side sliding surface 911 is in contact with the second lower-side sliding surface 921 formed on the lower-side portion 135. In such an embodiment, because the first lower-side sliding surface 911 and the second lower-side sliding surface 921 abut and are in contact with one another, the first housing part 11 and the second housing part 13 can be guided during the sliding movement, and consequently the stability of the sliding can be further increased. In addition, because the sliding direction is the impact axis A1 direction, the largest and dominant vibration of the vibrations arising in the hammer drill 1, namely, the vibration in the impact axis A1 direction, can be effectively inhibited (blocked) from being transmitted to the grasp part 131.

Figure 7:
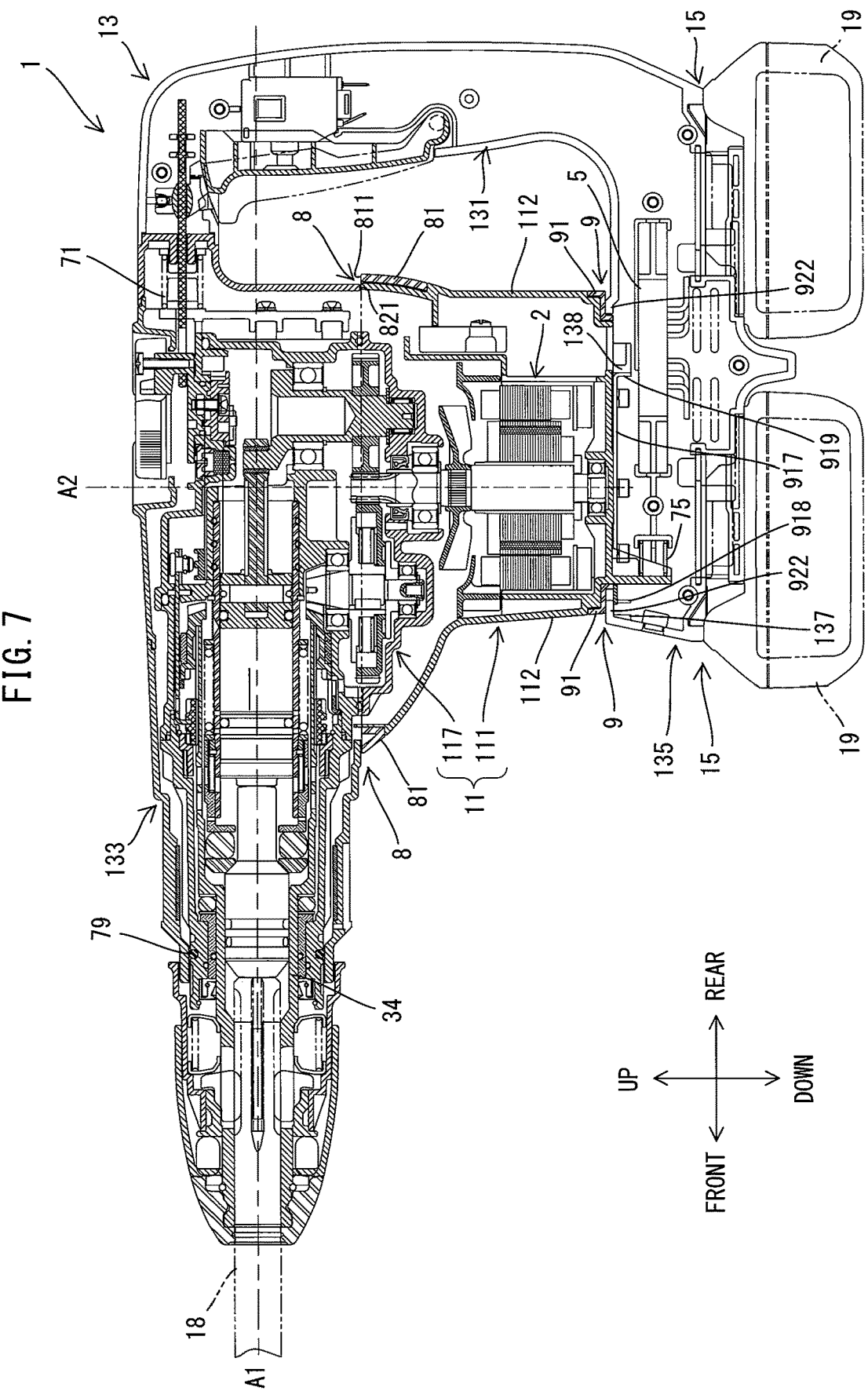
FIG. 7 is a longitudinal cross section of the hammer drill in the state in which a second housing has been moved frontward with respect to a first housing.

It is noted that, as shown in FIG. 7, when the second housing part 13 has moved forward relative to the first housing part 11 against the biasing forces of the first springs 71 and the second spring 75 during processing work, the rear-contact parts 138 make contact with the rear surfaces of the rearward-stop parts 919, thereby prohibiting (blocking) further movement of the lower-side portion 135 forward with respect to the motor-housing part 111. At this time, the rear-side portion of the first upper-side sliding surface 811 of the upper-side sliding part 81, which is provided around the entire circumference of the motor-housing part 111, is disposed rearward of the second upper-side sliding surface 821 of the upper-side portion 133; however, because the upper surface of the circumferential-wall part 112 of the motor-housing part 111 remains in contact with the second upper-side sliding surface 821, a gap does not arise between the upper-side portion 133 and the motor-housing part 111. Thereby, it is possible to prevent dust or the like from entering the interior of the housing 10 while the first housing part 11 is sliding relative to the second housing part 13 during operation of the hammer drill 1.

In the present embodiment, as shown in FIG. 3, the interposed part 922, which is provided on the upper-end part of the lower-side portion 135, is disposed in the gap between the lower-end part of the motor-housing part 111 (more specifically, the lower surface of the outer-edge part 913 of the lower-side sliding part 91) and the plate member 917, which is fixed to the lower-end part of the motor-housing part 111. Furthermore, the first lower-side sliding surface 911 is formed on the lower surface of the outer-edge part 913, and the second lower-side sliding surface 921 is formed on the upper surface of the interposed part 922. Providing the interposed part 922 in this manner makes it possible to reliably implement, with a simple configuration, a sliding-guide structure in the impact axis A1 direction. Furthermore, because the plate member 917 of the present embodiment is made of metal, even if, for example, the hammer drill 1 receives a severe impact by being dropped to the floor, the plate member 917 bends without breaking, thereby making it possible to prevent damage to the plate member 917 itself, the interposed part 922, and the like that could impair the operability of the hammer drill 1.

In the present embodiment, within the first housing part 11, the lower-side sliding part 91, which has the first lower-side sliding surface 911, is preferably formed of a material that differs from the material of the second housing part 13, which has the second lower-side sliding surface 921. Thereby, it is possible to prevent the first lower-side sliding surface 911 and the second lower-side sliding surface 921 from becoming welded (fused) together owing to frictional heat generated by sliding friction. Furthermore, in the present embodiment, the upper-side sliding part 81, which slides relative to the upper-side portion 133, likewise is preferably formed of a material that differs from the material of the second housing part 13. Thereby, the first upper-side sliding surface 811 and the second upper-side sliding surface 821 can likewise be prevented from becoming welded (fused) to one another owing to frictional heat generated by sliding friction.

In the present embodiment, the lower-side portion 135 comprises the battery-mounting parts 15, which are configured such that the batteries 19 can be mounted thereon and dismounted therefrom, on the end part on the side more spaced apart from the upper-side portion 133 in the rotational axis A2 direction (the up-down direction), that is, on the lower-end part. Because the lower-side portion 135 of the second housing part 13 is elastically coupled to the first housing part 11 such that the transmission of vibration generated in the first housing part 11 to the second housing part 13 is reduced, it is possible to inhibit or reduce chattering (contact bounce) caused by the terminals of the battery 19 rattling (bouncing) against (repeatedly separating from and then striking) the battery-connection terminals 155 of the lower-side portion 135 (thereby intermittently interrupting the supply of current to the motor 2) due to vibration when the batteries 19 are mounted on the battery-mounting parts 15 and the hammer drill 1 is being operated (i.e. vibrations are being generated by the motor 2 and the drive mechanism 3 in the first housing part 11). In addition, by mounting the batteries 19 on the battery-mounting parts 15, the mass of the second housing part 13 is increased (i.e. the mass of the batteries 19 is fixed to the second housing part 13 instead of the first housing part 11 where the vibration is generated during operation), and thereby a further reduction in vibration of the second housing part 13 can be achieved.

In another aspect of the present teachings, the two battery-mounting parts 15 of the present teachings are provided aligned in the impact axis A1 direction (the front-rear direction). Furthermore, the lower-side portion 135 has the vents 139, which are formed in the area covering the space 150 formed between the two sets of battery-connection terminals 155. The controller 5, which controls the operation of the hammer drill 1, is disposed adjacent the space 150 such that at least forward and rearward parts of the controller 5 overlap the two battery-mounting parts 15 in the front-rear direction. When two battery-mounting parts 15 are disposed in an aligned arrangement, the space 150 between the battery-connection terminals 155 could become a dead (unused) space. However, by arranging the controller 5 and the plurality of battery-mounting parts 15 according to the present embodiment, the area that could be a dead space is effectively utilized as the area in which the vents 139 are provided, thereby making it possible to realize an increased cooling efficiency with respect to the controller 5. In addition, the battery-mounting parts 15 and the controller 5 are each disposed on (in) the lower-side portion 135, and therefore wiring between the battery-mounting parts 15 and the controller 5 can be simplified.

In addition, because the wiring terminals 51 of the controller 5 project toward the space 150 between the two sets of battery-connection terminals 155 of the battery-mounting parts 15, the wiring terminals 51 and the wiring can be effectively cooled by the cooling draft that flows in from the vents 139 formed in the area of the lower-side portion 135 covering the space 150.

In addition, in the present embodiment, the fan 28 generates the flow of cooling draft that flows in from the vents 139, passes the periphery of the controller 5, and then passes the periphery of the motor 2; consequently, the controller 5 and the motor 2, which require cooling, can be efficiently cooled. In particular, in the present embodiment, a brushless motor is used as the motor 2. Because the control circuit, the inverter circuit, and the like are installed on the controller 5, which serves as the control apparatus of the brushless motor, the requirement for cooling is high. In response to this requirement, in the hammer drill 1, the control apparatus of the brushless motor can be effectively cooled by the arrangement of the parts disclosed in this embodiment.

A power tool such as the hammer drill 1 is configured to linearly drive the tool accessory 18 in the impact axis A1 direction; consequently, in general, it is often the case that the dimension in the impact axis A1 direction is set longer than in other directions. Thereby, according to the present embodiment, by aligning the plurality of battery-mounting parts 15 in the direction parallel to the impact axis A1, a compact arrangement becomes possible without increasing the dimensions in other directions. In addition, if multiple batteries 19 having the same shape are mounted on the battery-mounting parts 15, which are thus aligned, then, as shown in FIG. 2, the bottom surfaces of the batteries 19 are disposed in a substantially coplanar manner. Consequently, the hammer drill 1 can be placed on a flat surface, such as the floor or a workbench, with a stable attitude by setting the bottom surfaces of the batteries 19 downward facing.

In the present embodiment, the illumination unit 6, which is configured to radiate light toward the location at which work is performed by the tool accessory 18, is provided on the lower-side portion 135 of the second housing part 13, which is elastically coupled to the first housing part 11. Thereby, during processing work in which the hammer drill 1 is used, the user can easily confirm the state (positions) of the tool accessory 18, the workpiece, and the like disposed at the work location. In addition, by providing the illumination unit 6 on the lower-side portion 135 instead of on the motor-housing part 11, it is possible to protect (isolate) the illumination unit 6 from vibration.

Furthermore, the illumination unit 6 is configured to turn ON, linked to the manipulation (pressing) of the trigger 14 in order to energize and drive the motor 2, prior to the motor 2 being energized and driven. Thereby, the user can turn the illumination unit 6 ON merely by manipulating (e.g., pressing) the trigger 14 in order to energize and drive the motor 2. Furthermore, the user can easily confirm the location at which work will be performed by the tool accessory 18 even before the start of the actual work. Furthermore, in the present embodiment, the illumination unit 6 is configured such that it turns OFF after the drive of the motor 2 stops, which makes it possible to also confirm the processing location of the workpiece for a period of time after the processing work (hammering, drilling, hammer-drilling, etc.) has ended.

The correspondence between the structural elements of the present embodiment and the structural elements of the present teachings are described below. The hammer drill 1 is an exemplary structure that corresponds to the "power tool" of the present teachings. The impact axis A1 is an example that corresponds to a "drive axis" of the present teachings. The motor 2, the motor-main-body part 20, the stator 21, the rotor 22, and the motor shaft 25 are exemplary structures that correspond to a "motor," a "motor-main-body part," a "stator," a "rotor," and a "motor shaft," respectively, of the present teachings. The drive mechanism 3 is an exemplary structure that corresponds to a "drive mechanism" of the present teachings. The housing 10 is an exemplary structure that corresponds to a "housing" of the present teachings. The hammer element 36 and the motion-converting mechanism 30 are exemplary structures that correspond to a "hammer element" and a "motion-converting mechanism," respectively, of the present teachings. The hammer-drill mode and the hammer mode are examples that correspond to a "plurality of operation modes" of the present teachings. The fan 28, the controller 5, and the vents 139 are exemplary structures that correspond to a "fan," a "controller," and "vents," respectively, of the present teachings. The first housing part 11, the second housing part 13, and the grasp part 131 are exemplary structures that correspond to a "first housing part," a "second housing part," and a "grasp part," respectively, of the present teachings. The first springs 71, the second spring 75, and the O-ring 79 are exemplary structures that correspond to the "elastic element(s)" of the present teachings. The battery-mounting parts 15 are exemplary structures that correspond to a "battery-mounting part" of the present teachings. The illumination unit 6 is an exemplary structure that corresponds to an "illumination apparatus" of the present teachings. The trigger 14 is an exemplary structure that corresponds to a "manipulation member" of the present teachings.

Second Embodiment

A second embodiment will be explained below, with reference to FIG. 8. Most of a hammer drill 101 described by example in the present embodiment has a configuration identical to that of the hammer drill 1 of the first embodiment. Therefore, the illustration and explanation of identical structures are omitted or simplified, and principally only those structures that differ are explained, with reference to the drawings.

Figure 8:
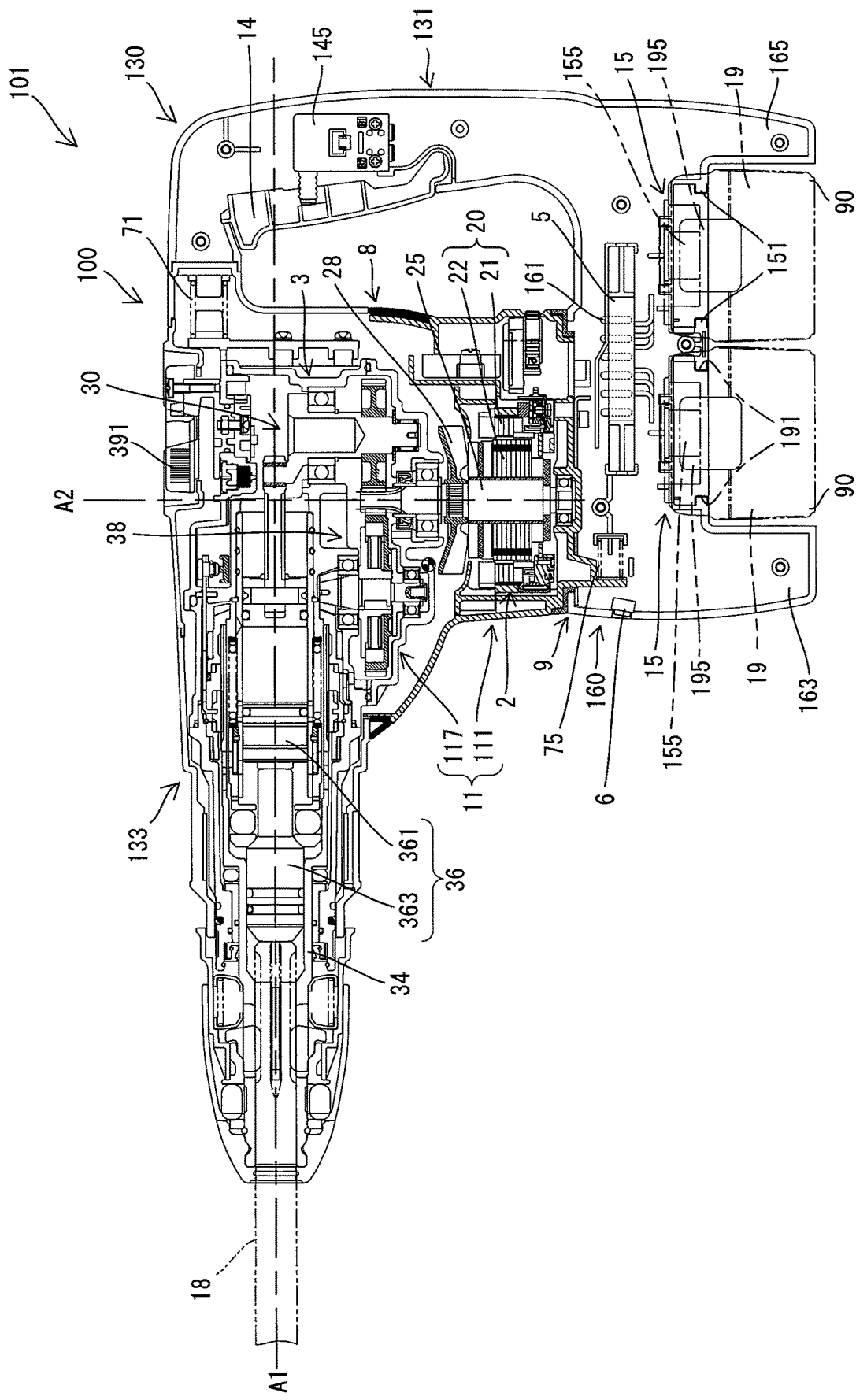
FIG. 8 is a longitudinal cross-sectional view of the hammer drill according to a second embodiment of the present teachings.

As shown in FIG. 8, as in the first embodiment, a housing 100 of the hammer drill 101 likewise comprises the first housing part 11 and a second housing part 130, which is elastically coupled to, and is capable of relative movement with respect to, the first housing part 11. The configuration and the internal structure of the first housing part 11 are identical to those of the first embodiment. That is, the motor 2 and the drive mechanism 3 are housed in the first housing part 11. More specifically, in the first housing part 11, the drive mechanism 3 is housed in the drive-mechanism housing part 117; in addition, the motor 2 is disposed inside the motor-housing part 111 such that the motor-main-body part 20 is spaced apart from the impact axis A1, and the rotational axis A2 extends in a direction that is orthogonal to the impact axis A1. In addition, the motor 2 is configured as a brushless motor (a so-called flat motor) in which the ratio of the stack thickness of the stator 21 to the diameter of the stator 21 is ⅕ or less, and the diameter of the rotor 22 is greater than the stack thickness of the stator 21, as was described above with regard to the first embodiment (which description is incorporated into the second embodiment).

On the other hand, the configuration and the internal structure of a lower-side portion 160 of the second housing part 130 differ from those of the first embodiment. More specifically, similar to the lower-side portion 135 (refer to FIG. 2) of the first embodiment, the lower-side portion 160 houses the controller 5 and comprises two battery-mounting parts 15 that are configured such that the batteries 19 can be mounted thereon and dismounted (removed) therefrom. However, in the present embodiment, in both of the two battery-mounting parts 15, the guide rails 151 are configured such that they extend in the left-right direction of the hammer drill 101, and the batteries 19 are mounted, from left to right, on the battery-mounting parts 15.

Owing to such a configuration, the area of the circumferential-wall part of the lower-side portion 160 that covers the space formed between the battery-connection terminals 155 of the two battery-mounting parts 15 is not as large as in the first embodiment. Consequently, in the present embodiment, vents 161, which function as cooling draft inflow ports, are provided in the up-down direction in the area corresponding to the controller 5 (the area that overlaps the controller 5 in a side view). It is noted that, in the present embodiment, six of the vents 161 are provided on each of the left and right wall parts of the lower-side portion 160. The cooling draft generated by the fan 28 flows from the vents 161 into the housing 100, passes the periphery of the controller 5, and then passes the periphery of the motor 2 and flows out from the vents 134 (refer to FIG. 1). Thereby, even though the locations at which the vents 161 are arranged differ from those of the first embodiment, the controller 5 and the motor 2 can be efficiently cooled by the cooling draft in the present embodiment as well.

Owing to the difference in the mounting directions of the batteries 19 described above, the combined length of the two battery-mounting parts 15 in the front-rear direction is shorter than that of the first embodiment and is shorter than the length of the lower-side portion 160 in the front-rear direction. Accordingly, in the present embodiment, the front-end part and the rear-end part of the lower-side portion 160 are formed such that they project downward from the battery-mounting parts 15 at the front side and the rear side of the two battery-mounting parts 15, respectively. In the up-down direction, the front-end part and the rear-end part of the lower-side portion 160 are configured such that their lower surfaces and the lower surfaces of the batteries 19 mounted on the battery-mounting parts 15 are substantially coplanar. When the batteries 19 are mounted on the battery-mounting parts 15, the front-end part and the rear-end part of the lower-side portion 160 function as battery-protection parts that protect exposed portions of the batteries 19, such as at least one corner-part area 90 of the corner-part areas 90 of the lower-end parts of the batteries 19, from external forces (impacts). More specifically, the front-end part functions as a front-side protective part 163 that, by interfering with (blocking) external forces (impacts) directed principally from the front (including from diagonal directions) toward the two corner-part areas 90 of the front-side, lower-end part of the front-side battery 19, protects these frontward corner-part areas 90. The rear-end part functions as a rear-side protective part 165 that, by interfering with (blocking) external forces (impact) directed principally from the rear (including from diagonal directions) toward the two corner-part areas 90 of the rear-side, lower-end part of the rear-side battery 19, protects these rearward corner-part areas 90.

The same as in the first embodiment, the hammer drill 101 of the second embodiment likewise uses the motor 2 that is configured as a flat brushless motor, and thereby the length of the region (volume) in which the motor 2 is disposed (i.e., the motor-housing part 111) in the rotational axis A2 direction is reduced. Based on such a configuration, even though the lower-side portion 160 is disposed on the lower side of the motor-housing part 111 and, in turn, the batteries 19 are mounted on the lower-side portion 160, it is possible to prevent an increase in the overall size (height in the up-down direction) of the hammer drill 101. In particular, if a crank mechanism is used as the motion-converting mechanism 30 of the drive mechanism 3 as in the first embodiment and the present embodiment, the size of the drive mechanism 3 would be larger than an embodiment in which an oscillating member is used as the drive mechanism 3. However, by configuring the motor 2 as discussed above, it is possible to prevent an increase in the overall size (height) of the hammer drill 101. In addition, according to the hammer drill 101 of the present second embodiment, structures of the hammer drill 101 that are the same as those in the first embodiment can obtain the same effects as explained in the first embodiment.

The hammer drill 101 in the present embodiment is an exemplary structure that corresponds to the "power tool" of the present teachings. The housing 100, the first housing part 11, and the second housing part 130 are exemplary structures that correspond to a "housing," a "first housing part," and a "second housing part," respectively, of the present teachings. The vents 161 are exemplary structures that correspond to "vents" of the present teachings.

The above-mentioned embodiments are merely illustrative examples, and power tools according to the present teachings are not limited to the configuration of the hammer drills 1, 101 that have been described above in an exemplary manner. For example, the modifications described by example below also can be utilized to develop additional embodiments of the present teachings. It is noted that any one of these modifications can be effected alone or a plurality thereof can be used in combination with the hammer drill 1 described in the embodiments or in each of the claims.

For example, in the above-mentioned embodiments, the hammer drills 1, 101—in which one of two operation modes (the hammer-drill mode that performs the hammering operation and the drill operation, and the hammer mode that performs only the hammering operation) are selectable, and the selected operation mode can be actuated—can be given as two examples of a power tool according to the present teaching. Nevertheless, power tools according to the present teachings also may be: a hammer drill (or rotary hammer) that, for example, as the operation modes, has, in addition to the hammer-drill mode and the hammer mode, a drill mode that performs only the drill operation; or a power hammer that has only the hammer mode as the operation mode. The power tool may be a power tool (e.g., a grinder, an angle drill, or the like) other than a striking or hammering tool.

The above-mentioned embodiments serve as examples in which two of the battery-mounting parts 15 are provided aligned in the front-rear direction. Nevertheless, the number of the battery-mounting parts 15 may be three or more, or only one. In addition, the direction in which the battery-mounting parts 15 are aligned is not limited to the direction parallel to the impact axis A1 and may be a direction that intersects the impact axis A1.

From the viewpoint of (i) preventing chattering (contact bounce) when the batteries 19 are mounted and vibration is being generated in the first housing part 11, (ii) improving the vibration isolation effect, etc., the battery-mounting parts 15 are preferably provided on the second housing part 13, which is elastically coupled to the first housing part 11 that houses the motor 2, the drive mechanism 3, etc., which are the vibration sources. Nevertheless, the provision of the battery-mounting parts 15 on the first housing part 11 is not excluded. In addition, the battery-mounting parts 15 may be provided on a housing that does not comprise a vibration-isolating housing structure. It is noted that a housing having the vibration-isolating housing structure does not necessarily have to have the same configuration as the housing 10. For example, in the housing 10, the number, position, and the like of the elastic elements for coupling the first housing part 11 and the second housing part 13 such that they are capable of relative movement with respect to one another can be modified where appropriate.

In the above-mentioned first embodiment, three of the vents 139 are formed in the areas on both sides (more specifically, the left and right wall parts) of the lower-side portion 135 (the circumferential-wall part 136) that cover the space 150. In addition, in the second embodiment, six of the vents 161 are formed at positions that overlap the controller 5 in a side view. Nevertheless, the number, shape, and the like of the vents 139, 161 is not limited to these examples and modifications can be effected where appropriate. In addition, the flow of the cooling draft that cools the controller 5 may be opposite to the flow that flows in from the vents 139, 161 and flows out from the vents 134; i.e. it may be a flow that flows in from the vents 134 and flows out from the vents 139, 161. In such an embodiment, the fan 28 that generates the flow of the cooling draft may be disposed on the lower side of the motor 2.

The above-mentioned embodiments are configured such that the illumination unit 6 turns ON, linked to the pressing of the trigger 14, prior to the motor 2 being energized and driven and turns OFF after the drive of the motor 2 stops. Nevertheless, the energization/drive and the stopping of the motor 2 may have the same timings as the turning ON and OFF of the illumination unit 6. The illumination unit 6 may turn ON prior to the start of the drive of the motor 2 and turn OFF at the same time as the drive of the motor 2 stops. Alternatively, the illumination unit 6 may be configured to turn ON and OFF in accordance with the manipulation of some other manipulation member (a button, or the like). In addition, the illumination unit 6 does not necessarily have to be provided.

Furthermore, the aspects below are constructed considering the gist of the present teachings and the above-mentioned embodiments. The aspects below may be used in combination with the hammer drills 1, 101 described in the embodiments, the above-mentioned modified examples, and/or the claims.

[First Aspect]
 The power tool may further comprise:
 a battery-mounting part provided on the housing and configured such that a battery can be mounted thereon and dismounted therefrom;
  wherein:
  when the rotational-axis direction of the motor shaft is defined as the up-down direction, the motor may be disposed on the lower side of the impact axis, and the battery-mounting part may be disposed on the lower side of the motor and disposed at a location that overlaps the motor when viewed from above the motor.

[Second Aspect]
 In the first aspect,
 the power tool may further comprise:
 a controller that is housed in the housing and configured to control the operation of the power tool;
 wherein:
 the controller may be disposed between the motor and the battery-mounting part in the up-down direction.

[Third Aspect]
 When the rotational-axis direction of the motor shaft is defined as the up-down direction, the grasp part may extend in the up-down direction;
 the second housing part may comprise:
  an upper-side portion that is connected to an upper-end part of the grasp part and covers part of the first housing part; and
  a lower-side portion that is connected to a lower-end part of the grasp part; and
 the first housing part may comprise:
  an upper-side sliding part configured to be capable of sliding relative to the upper-side portion of the second housing; and
  a lower-side sliding part configured to be capable of sliding relative to the lower-side portion of the second housing and provided on a lower side of the motor-main-body part.

[Fourth Aspect]
 In the third aspect,
 the battery-mounting part may be formed on the lower-side portion of the second housing part.

[Fifth Aspect]
 In the third or fourth aspect,
 the power tool may further comprise:
 a controller housed in the lower-side portion and configured to control the operation of the power tool.

EXPLANATION OF THE REFERENCE NUMBERS

1, 101 Hammer drill (rotary hammer)
10, 100 Housing
11 First housing part (first housing)
111 Motor-housing part (motor housing)
112 Circumferential-wall part (circumferential wall)
113 Bottom part (bottom or base)
114 Step part (step)
115 Guide part (guide)
117 Drive-mechanism housing part (drive mechanism housing)
13, 130 Second housing part (second housing)
131 Grasp part (grip or handle)
133 Upper-side portion
134, 139, 161 Vents
135 Lower-side portion
136 Circumferential-wall part
137 Front-contact part (front contact)
138 Rear-contact part (rear contact)
14 Trigger
140 Switch unit
15 Battery-mounting part
150 Space
151 Guide rail
153 Hook-engaging part
155 Battery-connection terminal
163 Front-side protective part
165 Rear-side protective part
2 Motor 20 Motor-main-body part (main body of motor)
21 Stator
22 Rotor
25 Motor shaft
26, 27 Bearings
28 Fan
29 Drive gear
3 Drive mechanism
30 Motion-converting mechanism
31 Crankshaft
311 Driven gear
312 Crank pin
32 Connecting rod
33 Piston
34 Tool holder
35 Cylinder
36 Hammer element
361 Striker
363 Impact bolt
365 Air chamber
38 Rotation-transmitting mechanism
39 Clutch
391 Mode-switching dial
5 Controller
51 Wiring terminal
6 Illumination unit
71 First spring
72 Plate member (plate)
73 Spring-seat part (spring seat)
74 Spring-seat part (spring seat)
75 Second spring
76 Spring-seat part (spring seat)
77 Spring-seat part (spring seat)
79 O-ring
8 Upper-side guide part (upper-side guide)
81 Upper-side sliding part
811 First upper-side sliding surface
821 Second upper-side sliding surface
9 Lower-side guide part (lower-side guide)
90 Corner-part area
91 Lower-side sliding part
911 First lower-side sliding surface
912 Outer-circumferential part
913 Outer-edge part
914 Protruding part (protrusion)
917 Plate member (plate)
918 Forward-stop part (forward stop)
919 Rearward-stop part (rearward stop)
921 Second lower-side sliding surface
922 Interposed part (plain linear bearing or linear motion guide)
18 Tool accessory (e.g., a tool bit)
19 Battery
191 Guide groove
193 Hook
195 Button

We claim:

1. A power tool configured to at least linearly reciprocally drive a tool accessory in relation to a drive axis that extends in a first direction, comprising:
a brushless motor comprising a stator having a stack thickness and an outer diameter, a rotor having a diameter and being disposed in an interior of the stator, and a motor shaft extending from the rotor and having a rotational axis;
a drive mechanism comprising a hammer element configured to at least linearly drive the tool accessory in the first direction by striking the tool accessory, and a crank mechanism configured to convert rotary motion of the motor shaft into linear motion and to transmit said linear motion to the hammer element;
a housing that houses the motor and the drive mechanism; and
a first battery-mounting part provided on the housing and configured to detachably mount a first rechargeable battery;
wherein:
the stator and rotor are spaced apart from the drive axis;
the rotational axis of the motor shaft extends in a second direction that intersects the drive axis and the first direction;
the first battery-mounting part includes a first means for physically engaging the first rechargeable battery and a second means for electrically connecting to the first rechargeable battery;
when viewed in a third direction that is perpendicular to both the first direction and the second direction, the brushless motor is interposed between the drive axis and at least one of the first means and the second means in a direction perpendicular to the first direction such that at least a portion of the brushless motor is aligned with at least a portion of the at least one of the first means and the second means in the second direction;
the outer diameter of the stator is at least five times greater than the stack thickness; and
the diameter of the rotor is greater than the stack thickness.

2. The power tool according to claim 1, further comprising:
a fan that is rotated by the motor; and
a controller configured to control the operation of at least the brushless motor;
wherein:
the fan is configured to generate a cooling draft that flows in from a vent formed in the housing, passes along the controller, and then passes along the motor; and
when viewed in the third direction, the fan is interposed between the drive axis and the at least one the first means and the second means in the direction perpendicular to the first direction such that at least a portion of the fan is aligned with at least a portion of the at least one of the first means and the second means in the second direction.

3. The power tool according to claim 1, further comprising:
a grasp part configured to be graspable by a user;
wherein:
the housing comprises a first housing part that houses the motor and the drive mechanism; and
the grasp part is coupled to, and is capable of moving relative to, the first housing part via an elastic element.

4. The power tool according to claim 3, wherein:
the housing further comprises a second housing part that is coupled to, and is capable of sliding in parallel to the first direction relative to, the first housing part via the elastic element;
the second housing part includes the grasp part and a second portion that extends in the first direction; and
the first and second means are provided on the second portion of the second housing part such that, when viewed in the third direction, the second portion of the second housing part is interposed between the stator and the first and second means in the direction perpendicular to the first direction.

5. The power tool according to claim 1, further comprising:
a controller housed in the housing and configured to control operation of at least the brushless motor;
wherein the controller, when viewed in the third direction, is at least partially interposed between the brushless motor and the at least one of the first and second means in the direction perpendicular to the first direction such that at least a portion of the brushless motor is aligned with at least a portion of the controller in the second direction.

6. A power tool, comprising:
a brushless motor comprising a stator having a stack thickness and an outer diameter, a rotor having a diameter and being disposed in an interior of the stator, and a motor shaft extending from the rotor and having a rotational axis;
a drive mechanism comprising a striker and an impact bolt configured to at least linearly reciprocally drive a tool accessory along a drive axis that extends in a first direction by the impact bolt striking the tool accessory, and a crank mechanism configured to convert rotary motion of the motor shaft into linear motion and to transmit said linear motion to a piston that is slidably disposed in a cylinder and is configured to linearly drive the striker in the cylinder along the drive axis;
a first housing that houses the motor and the drive mechanism; and
a first battery-mounting part having battery-connection terminals provided on a second housing and configured to detachably mount a first rechargeable battery;
wherein:
the drive axis does not intersect the stator, the rotor or the motor shaft;
the rotational axis of the motor shaft intersects the first direction;
when viewed in a lateral direction that is perpendicular to both the first direction and the rotational axis, the brushless motor is interposed between the drive axis and the battery-connection terminals in a direction perpendicular to the first direction such that the at least a portion of the brushless motor is aligned with at least a portion of the battery-connection terminals in the direction perpendicular to the first direction;
the outer diameter of the stator is at least five times greater than the stack thickness; and
the diameter of the rotor is greater than the stack thickness.

7. The power tool according to claim 6, wherein the drive mechanism further comprises a plurality of gears configured to transmit the rotary motion of the motor shaft to the tool accessory to thereby rotate the tool accessory.

8. The power tool according to claim 7, further comprising:
a fan operably coupled to the motor shaft; and
a controller configured to control the operation of at least the brushless motor;
wherein the fan and the first housing are configured to generate a cooling draft that flows in from a vent formed in the first housing, passes along the controller, and then passes along the motor; and
when viewed in the lateral direction, the fan is interposed between the drive axis and the battery-connection terminals in the direction perpendicular to the first direction such that at least a portion of the fan is aligned with at least a portion of the battery-connection terminals in the direction perpendicular to the first direction.

9. The power tool according to claim 8, wherein:
the controller is disposed in the second housing; and
when viewed in the lateral direction, at least a portion of the brushless motor is aligned with at least a portion of the controller in the direction perpendicular to the first direction.

10. The power tool according to claim 9, further comprising:
a handle is coupled to, and capable of moving relative to, the first housing via at least one elastic element.

11. The power tool according to claim 10, wherein:
the second housing is coupled to, and is slidable in parallel to the first direction relative to, the first housing via the elastic element; and
the second housing includes the handle.

12. The power tool according to claim 11, wherein:
the outer diameter of the stator is at least seven times greater than the stack thickness.

13. The power tool according to claim 12, further comprising:
a light device disposed on a surface of the second housing and configured to illuminate the vicinity of the tool accessory; and
a trigger disposed on the handle;
wherein the controller is configured to turn ON the light device as soon as the trigger is depressed and prior to the brushless motor being energized and driven.

14. The power tool according to claim 13, further comprising a second battery-mounting part defined on the second housing and configured to detachably mount a second rechargeable battery.

15. A power tool configured to perform work by driving a tool accessory in relation to a drive axis that extends in a first direction, comprising:
a brushless motor comprising a stator having a stack thickness and an outer diameter, a rotor having a diameter and being disposed in an interior of the stator, and a motor shaft extending from the rotor and having a rotational axis;
a drive mechanism configured to drive the tool accessory by using motive power output by the motor;
a first housing part that houses the motor and the drive mechanism;
a second housing part coupled to, and capable of sliding in parallel to the first direction relative to, the first housing part via an elastic element, the second housing part including a grasp part configured to be graspable by a user and a second portion that extends in the first direction; and
a first battery-mounting part having battery-connection terminals provided on the second portion of the second housing part and configured to detachably connect to a first rechargeable battery;
wherein:
the stator and rotor are spaced apart from the drive axis;
the rotational axis of the motor shaft extends in a second direction that intersects the drive axis and the first direction;
when viewed in a third direction that is perpendicular to both the first direction and the second direction, the brushless motor is interposed between the drive axis and the battery-connection terminals in a direction perpendicular to the first direction such that at least a portion of the brushless motor is aligned with at least a portion of the battery-connection terminals in the second direction, and the second portion of the second housing part is interposed between the stator and the battery-connection terminals in the second direction;

the outer diameter of the stator is at least five times greater than the stack thickness; and the diameter of the rotor is greater than the stack thickness.

16. The power tool according to claim 15, wherein:

the power tool is configured such that one of a plurality of operation modes is manually selectable and the power tool is configured to operate in accordance with the selected operation mode.

17. The power tool according to claim 15, further comprising:

a controller configured to control the operation of the brushless motor;

wherein:

the controller is housed within the second portion of the second housing part; and when viewed in the third direction, the controller is at least partially interposed between the brushless motor and the battery-connection terminals in the direction perpendicular to the first direction such that at least a portion of the brushless motor is aligned with at least a portion of the controller in the second direction.

18. The power tool according to claim 17, further comprising:

an illumination apparatus provided on the second portion of the second housing part and configured to shine light toward the location at which work is performed by the tool accessory; and a manipulation member configured to be manually operated by the user in order to energize and drive the motor;

wherein:

the illumination apparatus is configured to turn ON, linked to the manual operation of the manipulation member, prior to the brushless motor being energized and driven.

19. The power tool according to claim 18, wherein the second housing part further comprises a second battery-mounting part configured to detachably mount a second rechargeable battery.

20. The power tool according to claim 15, further comprising:

a fan that is rotated by the motor; and a controller configured to control the operation of at least the brushless motor;

wherein:

the fan is configured to generate a cooling draft that flows in from a vent formed in the housing, passes along the controller, and then passes along the motor;

when viewed in the third direction, the fan is interposed between the drive axis and the battery-connection terminals in the direction perpendicular to the first direction such that at least a portion of the fan is aligned with the battery-connection terminals in the second direction; and when viewed in the third direction, the controller is at least partially interposed between the brushless motor and the battery-connection terminals in the direction perpendicular to the first direction such that at least a portion of the brushless motor is aligned with at least a portion of the controller in the second direction.

21. The power tool according to claim 20, wherein the outer diameter of the stator is at least seven times greater than the stack thickness.

* * * * *